(12) United States Patent
Hao et al.

(10) Patent No.: US 12,100,987 B2
(45) Date of Patent: *Sep. 24, 2024

(54) WIRELESS CHARGING TRANSMITTER SYSTEM AND METHOD FOR CONTROLLING SAME

(71) Applicant: Halo Microelectronics Co., Ltd., Foshan (CN)

(72) Inventors: Yueguo Hao, Foshan (CN); Songnan Yang, Frisco, TX (US)

(73) Assignee: Halo Microelectronics Co., Ltd., Foshan (CN)

( * ) Notice: Subject to any disclaimer, the term of this patent is extended or adjusted under 35 U.S.C. 154(b) by 561 days.

This patent is subject to a terminal disclaimer.

(21) Appl. No.: 17/328,207

(22) Filed: May 24, 2021

(65) Prior Publication Data

US 2022/0060043 A1 Feb. 24, 2022

(30) Foreign Application Priority Data

Aug. 21, 2020 (CN) .......................... 202010848030.3

(51) Int. Cl.
*H02J 7/02* (2016.01)
*H02J 50/12* (2016.01)
*H02J 50/40* (2016.01)
*H02J 50/80* (2016.01)

(52) U.S. Cl.
CPC ................ *H02J 7/02* (2013.01); *H02J 50/12* (2016.02); *H02J 50/40* (2016.02); *H02J 50/80* (2016.02)

(58) Field of Classification Search
CPC ........................................................ H02J 7/02
USPC ........................................................ 320/108
See application file for complete search history.

(56) References Cited

U.S. PATENT DOCUMENTS

| 2013/0005252 | A1* | 1/2013 | Lee .......................... | H02J 50/90 307/18 |
| 2014/0111153 | A1* | 4/2014 | Kwon ..................... | H02J 50/40 320/108 |
| 2014/0203769 | A1* | 7/2014 | Keeling ................. | B60L 53/38 320/108 |
| 2015/0180284 | A1* | 6/2015 | Kang ..................... | H02J 50/80 307/104 |

* cited by examiner

*Primary Examiner* — Yalkew Fantu
(74) *Attorney, Agent, or Firm* — AP3 Law Firm PLLC

(57) ABSTRACT

A system includes at least two transmit coils. The system further comprises at least two transmit circuit units, a detection circuit, a communication module and a controller. The detection circuit is electrically connected to each of the transmit circuit units. The detection circuit and the communication module are both configured to acquire the coupling relationship between each of the transmit coils and a receive coil. The controller is electrically connected to the detection circuit, each of the transmit circuit units, and the communication module. The controller is configured to control, based on the acquired coupling relationship, the current output by each of the transmit circuit unit. The controller controls each of the transmit circuit units to supply a suitable current amplitude and a current phase to each of the transmit coils to achieve control of superimposed magnetic fields generated by currents on the transmit coils.

20 Claims, 12 Drawing Sheets

ND METHOD FOR
CONTROLLING SAME

WIRELESS CHARGING TRANSMITTER SYSTEM AND METHOD FOR CONTROLLING SAME

PRIORITY CLAIM

This application claims priority to Chinese Patent Application No. 202010848030.3, filed on Aug. 21, 2020, which is hereby incorporated by reference in its entirety.

TECHNICAL FIELD

The present disclosure relates to the technical field of wireless charging, and in particular, relates to a wireless charging transmitter and its control method.

BACKGROUND

With the development of smart terminals, wireless charging has become a standard function equipped on high-end smart terminals. Since energy is transferred between a wireless charger and a smart terminal through a magnetic field, it is not necessary to have a wire between the wireless charger and the smart terminal. Neither the charger nor the smart terminal has exposed conductive contacts. In addition, wireless charging is capable of achieving relatively longer distance wireless energy transfer. As a result, the charging of the smart terminal is more flexible. Therefore, the wireless charging technology is being more and more widely applied to the smart terminals.

However, in a conventional wireless charging system for the smart terminals, the wireless charging transmitters usually take the form of a charging base. A wireless charging transmitter base based on the Qi standard usually consists of one or more coils. During the charging process, the smart terminal needs to be placed close to the transmitter base and precisely aligned with one coil in the transmitter base, such that a highly-efficient wireless transmission of electrical energy can be achieved. However, once the distance between the smart terminal and the transmitter base increases, or the smart terminal is not precisely aligned with the transmitter base, the wireless charging fails. In a system compliant with the high-frequency wireless charging standard Airfuel Alliance, although flexibility in the charging distance and planar freedom are improved by increasing the operating frequency, this solution is still technically based on charging the smart terminal by a magnetic field of a single direction generated by a transmit coil, and thus requirements are still imposed on placement postures of the smart terminal. This greatly restricts the interactions between a user and a smart terminal during wireless charging, and limits the position and orientation flexibility in wireless charging of the smart terminal. Therefore, the user experience of this system is not good.

SUMMARY

In order to solve one of the above technical problems at least to some extent, the present disclosure provides a wireless charging transmitter system and its control method, which implements collaborative operation of a plurality of transmitter coils and supports more spatial postures of the receiver. In this way, in the wireless charging of the wireless charging receiver, the position and orientation flexibility is even greater, and the user experience is greatly improved.

In a first aspect, embodiments of the present disclosure provide a wireless charging transmitter system. The wireless charging transmitter system includes at least two transmit coils, configured to simultaneously transmit electrical energy to a receive coil, at least two transmit circuit units, each of the transmit circuit units being electrically connected to each one of the transmit coils, and being configured to supply a current to the transmit coil, a detection circuit, electrically connected to each of the transmit circuit units, and configured to detect a coupling relationship between each of the transmit coils and the receive coil, a communication module, configured to acquire a coupling relationship between each of the transmit coils and the receive coil; and a controller, electrically connected to the detection circuit and each of the transmit circuit units, and configured to control, based on the coupling relationships, the current output by each of the transmit circuit units to control the current parameter of each of the transmit coils.

In some embodiments, the transmit circuit unit includes an inverter circuit, wherein the inverter circuit is electrically connected to the transmit coil, the controller, and an external direct-current power source, and is configured to convert a direct current output by the external direct-current power source to an alternating current and transmit the alternating current to the transmit coil.

In some embodiments, the transmit circuit unit further includes a DC/DC converter circuit, wherein the DC/DC converter circuit is electrically connected to the external direct-current power source, the inverter circuit, and the controller, and is configured to convert an output voltage of the external direct-current power source and transmit the converted output voltage to the inverter circuit.

In some embodiments, the transmit circuit unit further includes a tuning/compensation circuit, wherein the tuning/compensation circuit is electrically connected to the inverter circuit, the transmit coil, and the controller, and is configured to dynamically tune and compensate for the transmit coil.

In some embodiments, the wireless charging transmitter system further includes an oscillator, wherein the oscillator is electrically connected to the controller, and is configured to supply a clock signal.

In some embodiments, phases between currents of the transmit coils are coherent, and orientations of magnetic fields generated by the transmit coils are not parallel.

In some embodiments, a coupling coefficient of the magnetic fields between the transmit coils is less than a predetermined threshold.

In a second aspect, embodiments of the present disclosure provide a method for controlling a wireless charging transmitter, applicable to the wireless charging transmitter system as described above. The method includes acquiring a detection signal, and determining a coupling relationship between each of the transmit coils and the receive coil based on the detection signal, determining a current parameter for each of the transmit coils based on the coupling relationship, and determining and generating a control signal based on the current parameter, to respectively control the at least two transmit circuit units to supply a current to the at least two transmit coils based on the current parameters.

In some embodiments, the coupling relationship includes a coupling strength, and the current parameter includes a current magnitude.

The transmit circuit unit includes an inverter circuit, wherein the inverter circuit is electrically connected to the transmit coil, the controller, and an external direct-current power source, and is configured to convert a direct current output by the external direct-current power source to an alternating current and transmit the alternating current to the transmit coil;

Based on the detection signal, determining the coupling relationship between each of the transmit coils and the receive coil based on the detection signal includes determining a coupling strength between each of the transmit coils and the receive coil based on the detection signal, and determining the current parameter for each of the transmit coils based on the coupling relationship further including determining a current magnitude of each of the transmit coils based on the coupling strength.

In some embodiments, the detection signal includes an input impedance of the equivalent load of the inverter circuit.

In some embodiments, the input impedance is proportional to the coupling strength.

In some embodiments, the greater the coupling strength, the greater the current magnitude of the transmit coil.

In some embodiments, the detection signal includes a received signal parameter of the receive coil.

In some embodiments, the transmit circuit unit further includes a DC/DC converter circuit, the DC/DC converter circuit being electrically connected to the external direct-current power source, the inverter circuit, and the controller. The control signal includes a first control signal, the first control signal acting on the DC/DC converter circuit. Determining the control signal based on the current parameter includes determining the first control signal based on the current magnitude to control an output voltage of the DC/DC converter circuit.

In some embodiments, the coupling relationship includes a coupling effect relationship, and the current parameter includes a current phase relationship.

Based on the detection signal, determining the coupling relationship between each of the transmit coils and the receive coil based on the detection signal further includes determining a coupling effect relationship between each of the transmit coils and the receive coil based on the detection signal; and Based on the coupling relationship, determining the current parameter for each of the transmit coils based on the coupling relationship includes determining a current phase relationship between the transmit coils based on the coupling effect relationship.

In some embodiments, the received signal parameter includes a first received signal parameter, a second received signal parameter, and a third received signal parameter.

Based on the detection signal, determining the coupling effect relationship between each of the transmit coils and the receive coil based on the detection signal includes controlling a first transmit coil of the at least two transmit coils to individually transmit electrical energy to the receive coil, and acquiring the first received signal parameter by the communication module, controlling a second transmit coil of the at least two transmit coils to individually transmit electrical energy to the receive coil, and acquiring the second received signal parameter by the communication module, controlling the first transmit coil and the second transmit coil of the at least two transmit coils to simultaneously transmit electrical energy to the receive coil, and acquiring the third received signal parameter by the communication module, and determining the coupling effect relationships between the first transmit coil and the receive coil and between second transmit coil and the receive coil based on the first received signal parameter, the second received signal parameter, and the third received signal parameter.

In some embodiments, the coupling effect relationship includes a positive coupling relationship and a negative coupling relationship.

Determining the coupling effect relationship between the first transmit coil and the receive coil and between the second transmit coil and the receive coil based on the first received signal parameter, the second received signal parameter, and the third received signal parameter includes determining that the first transmit coil and the second transmit coil are in a positive coupling relationship with the receive coil if the third received signal parameter is greater than or equal to a maximum value of the first received signal parameter and the second received signal parameter, and determining that the first transmit coil and the second transmit coil are in a negative coupling relationship with the receive coil if the third received signal parameter is less than the maximum value of the first received signal parameter and the second received signal parameter.

In some embodiments, determining the current phase relationship between the transmit coils based on the coupling effect relationship includes determining that the first transmit coil and the second transmit coil have the same current phase if the first transmit coil and the second transmit coil are in the positive coupling relationship with the receive coil, and determining that the first transmit coil and the second transmit coil have reverse current phases if the first transmit coil and the second transmit coil are in the negative coupling relationship with the receive coil.

In some embodiments, the control signal includes a second control signal, the second control signal being configured to drive the inverter circuit, and determining the control signal based on the current parameter includes determining a phase of the second control signal based on the current phase relationship.

In some embodiments, the wireless charging transmitter system further includes an oscillator, wherein the oscillator is electrically connected to the controller, and is configured to supply a clock signal, and the method further includes acquiring the clock signal and using the clock signal as a reference signal for generating the second control signal.

In some embodiments, the method further includes adjusting a delay between the reference signals based on the current phase relationship, and determining the second control signal based on the reference signal and the delay between the reference signals.

In some embodiments, the second control signal is a PWM signal.

In some embodiments, the transmit circuit unit further includes a tuning/compensation circuit, wherein the tuning/compensation circuit is electrically connected to the inverter circuit, the transmit coil, and the controller, and the method further includes adjusting a parameter of the tuning/compensation circuit based on an input impedance of the equivalent load of the inverter circuit to dynamically tune and compensate for the transmit coil.

As compared with the related art, the present disclosure at least achieves the following beneficial effects: The wireless charging transmitter system according to the present disclosure includes at least two transmit coils, at least two transmit circuit units, a detection circuit, and a controller; each of the transmit circuit units is electrically connected to each of the transmit coils; the detection circuit is electrically connected to each of the transmit circuit units; the controller is electrically connected to the detection circuit and each of the transmit circuit units, and controls, based on a coupling relationship between each of the transmit coils and a receive coil, the current output by each of the transmit circuit units to control the current parameter of each of the transmit coils. Therefore, a current of each of the transmit coils may be separately controlled to generate magnetic fields with different orientations; the controller controls each of the transmit circuit units to supply a suitable current amplitude and a current phase to each of the transmit coils to achieve control of superimposed magnetic fields generated by the coils. In this way, collaborative operation of the coils is implemented, diversified spatial postures of the receiver are supported, and the position and orientation flexibility in charging the receiver is enhanced, such that users may "play while charging," and user experience is improved.

The foregoing has outlined rather broadly the features and technical advantages of the present disclosure in order that the detailed description of the disclosure that follows may be better understood. Additional features and advantages of the disclosure will be described hereinafter which form the subject of the claims of the disclosure. It should be appreciated by those skilled in the art that the conception and specific embodiment disclosed may be readily utilized as a basis for modifying or designing other structures or processes for carrying out the same purposes of the present disclosure. It should also be realized by those skilled in the art that such equivalent constructions do not depart from the spirit and scope of the disclosure as set forth in the appended claims

BRIEF DESCRIPTION OF THE DRAWINGS

One or more embodiments are illustrated by way of example, and not by limitation, in the figures of the accompanying drawings, wherein components having the same reference numeral designations represent like components throughout. The drawings are not to scale, unless otherwise disclosed.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

Figure 1:
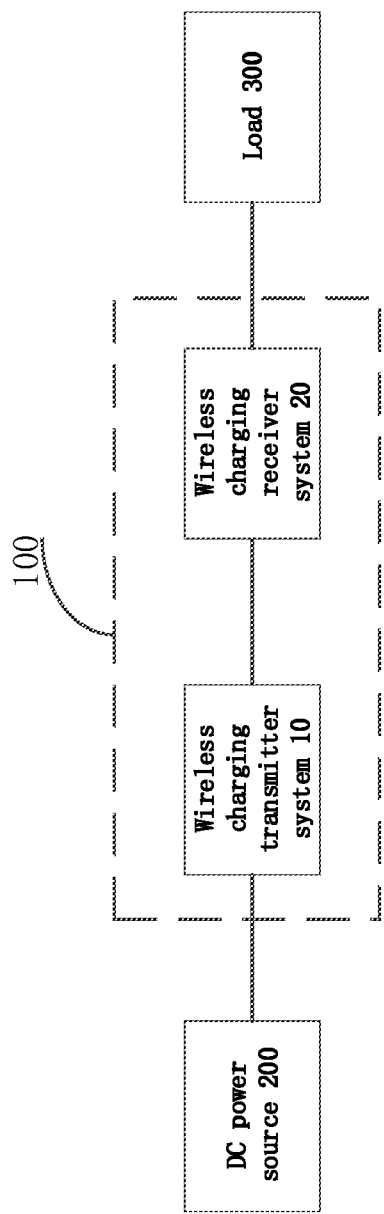
FIG. 1 is a diagram of an application scenario of a wireless charging transmitter system according to an embodiment of the present disclosure.

The making and using of the presently preferred embodiments are discussed in detail below. It should be appreciated, however, that the present disclosure provides many applicable inventive concepts that can be embodied in a wide variety of specific contexts. The specific embodiments discussed are merely illustrative of specific ways to make and use the disclosure, and do not limit the scope of the disclosure.

For clear descriptions of objectives, technical solutions, and advantages of the present disclosure, the present disclosure is further described in detail below by reference to the embodiments and the accompanying drawings. It should be understood that the specific embodiments described herein are only intended to explain the present disclosure instead of limiting the present disclosure. Based on the embodiments of the present disclosure, all other embodiments derived by persons of ordinary skill in the art without any creative efforts shall fall within the protection scope of the present disclosure.

It should be noted that, in the absence of conflict, features in the embodiments of the present disclosure may be incorporated, which all fall within the protection scope of the present disclosure. In addition, although logic function module division is illustrated in the schematic diagrams of apparatuses, and logic sequences are illustrated in the flowcharts, in some occasions, steps illustrated or described by using modules different from the module division in the apparatuses or in sequences different from those illustrated. Further, the terms "first," "second," and "third" used in this text do not limit data and execution sequences, and are intended to distinguish identical items or similar items having substantially the same functions and effects.

One or more embodiments are illustrated by way of example, and not by limitation, in the figures of the accompanying drawings, wherein components having the same reference numeral designations represent like components throughout. The drawings are not to scale, unless otherwise disclosed.

Referring to FIG. 1, FIG. 1 is a diagram of an application scenario of a wireless charging transmitter system 10 according to an embodiment of the present disclosure. As illustrated in FIG. 1, the wireless charging transmitter system 10 is applicable to a wireless charging system 100. The wireless charging system 100 includes the wireless charging transmitter system 10 and a wireless charging receiver system 20. The wireless charging receiver system 20 may be configured in a smart terminal. The smart terminal may be any suitable type of smart terminal configured to establish coupling with the wireless charging transmitter system 10, such as, a mobile phone, a tablet computer, a smart watch, a smart remote control, or the like. The wireless charging transmitter system 10 may be configured in a charging base, a desktop, or the like apparatus. The wireless charging transmitter system 10 is further electrically connected to a direct-current power source 200. The direct-current power source 200 supplies power to the wireless charging transmitter system 10. The direct-current power source 200 may be a power source obtained by rectification of a mains power by a rectifier circuit. The wireless charging receiver system 20 is further electrically connected to a load 300, and is configured to charge the load 300. Under normal circumstances, the load 300 is a battery. When the battery of a smart terminal needs to be charged, the wireless charging transmitter system 10 conducts a series of conversions on electrical energy supplied by the direct-current power source 200, and transmits the converted electrical energy by a transmit coil thereof. The transmit coils are coupled to the receive coil in the wireless charging receiver system 20. The transmit coils transmit electrical energy to the receive coil, and the receive coil receives the electrical energy. An internal circuit of the wireless charging receiver system 20 correspondingly processes the electrical energy to charge the load 300. In the conventional technologies, highly efficient wireless transmission of the electrical energy may be achieved only when the transmit coils need to be attached to and tightly coupled to the receive coil. In addition, a slightly greater charging range is not supported, or diversified charging postures (for example, vertically standing, horizontally placement, a spatial posture held when a user is in interaction with a smart terminal, or the like) of the smart terminal are not supported.

Figure 2A:
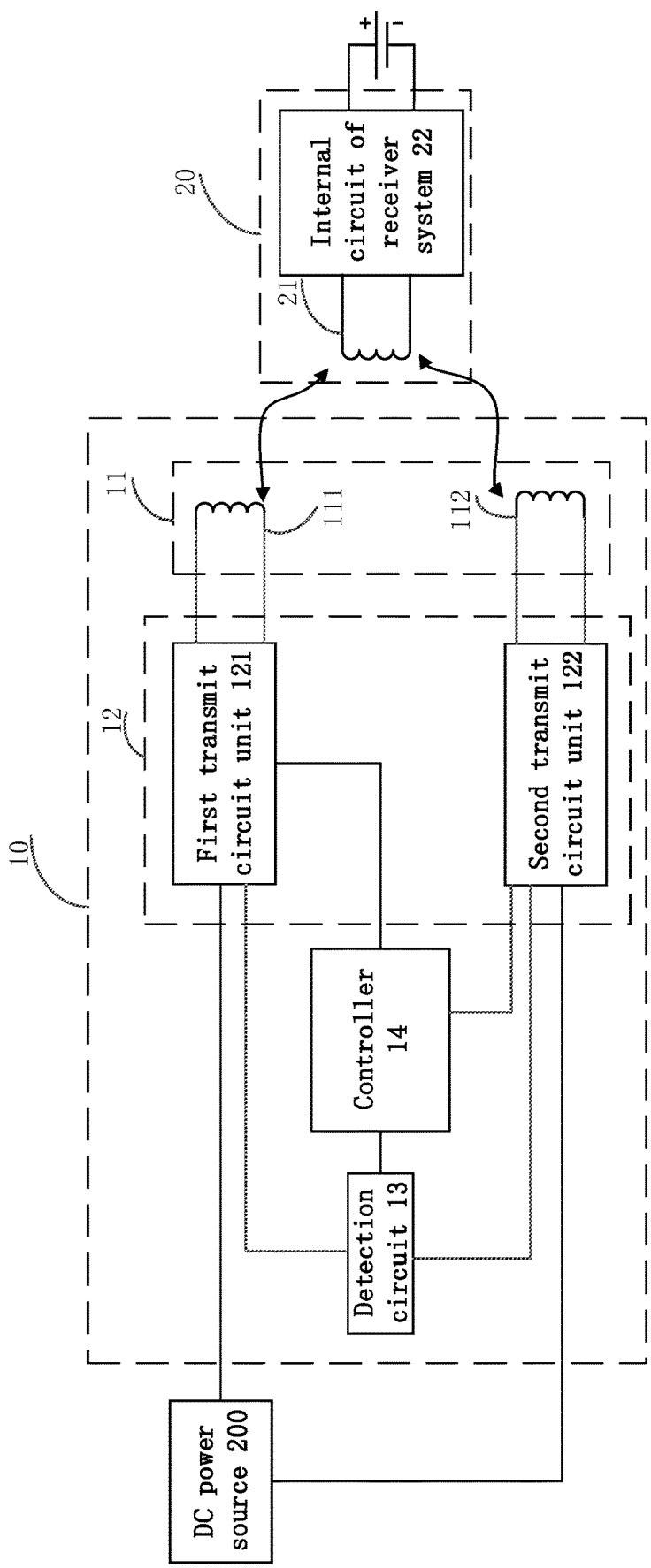
FIG. 2a is a structural diagram of a wireless charging transmitter system according to an embodiment of the present disclosure.

Referring to FIG. 2a, FIG. 2a illustrates a wireless charging transmitter system 10 according to an embodiment of the present disclosure. The wireless charging transmitter system 10 includes at least two transmit coils 11, at least two transmit circuit units 12, a detection circuit 13, a controller 14, and a communication module 15. FIG. 2a illustrates two transmit coils and two transmit circuit units, which are a first transmit circuit unit 121, a second transmit circuit unit 122, a first transmit coil 111, and a second transmit coil 112 respectively. The first transmit circuit unit 121 is electrically connected to the first transmit coil 111. The second transmit circuit unit 122 is electrically connected to the second transmit coil 112. The transmit circuit unit 12 is configured to supply a current to the corresponding transmit coil 11. The detection circuit 13 is electrically connected to both the first transmit circuit unit 121 and the second transmit circuit unit 122, and is configured to detect a coupling relationship between each of the transmit coils 11 and the receive coil 21. The communication module 15 is electrically connected to the controller 14, and is also configured to detect the coupling relationship between each of the transmit coils and the receive coil. The controller 14 is electrically connected to the detection circuit 13, the first transmit circuit unit 121, the second transmit circuit unit 122, and the communication module 15, and is configured to control, based on the coupling, a current output by each of the transmit circuit units 12, and hence to control the current parameter of each of the transmit coils 11 and control the at least two transmit coils 11 to simultaneously transmit electrical energy to the receive coil 21 based on the current parameters.

The direct-current power source 200 is further electrically connected to the first transmit circuit unit 121 and the second transmit circuit unit 122, and is configured to provide a direct current power source to both the first transmit circuit unit 121 and the second transmit circuit unit 122. The first transmit circuit unit 121 and the second transmit circuit unit 122 each convert the direct current to an alternating current, and supply the alternating current to their corresponding transmit coils 11.

The wireless charging receiver system 20 includes the receive coil 21 and an internal circuit 22 of the receiver system. The receive coil 21 is coupled to both the first transmit coil 111 and the second transmit coil 112, and is configured to receive the electrical energy of the transmit coils 11, process the electrical energy by the internal circuit 22 of the receiver system, and charge the battery.

The communication module 15 is electrically connected to the controller 14. The wireless charging transmitter system 10 and the wireless charging receiver system 20 may be communicably connected to each other by their respective communication modules 15. Upon receiving communication information from the communication module (not illustrated) of the wireless charging receiver system 20, the communication module 15 of the wireless charging transmitter system 10 transmits the communication information to the controller 14, such that the controller 14 generates a corresponding control signal based on the communication information. The communication modules of these two systems are capable of communicating with each other outside an operating frequency band of the wireless charging system 100, to achieve information transmission. In some embodiments, the wireless charging transmitter system 10 and the wireless charging receiver system 20 communicate with each other by modulating and demodulating the currents flowing through the transmit coils 11 and the receive coil 21.

Each of the transmit coils 11 and the receive coil 21 are subject to a unique coupling relationship. The coupling relationship reflects a coupling strength and a phase relationship between each of the transmit coils 11 and the receive coil 21. In some embodiments, when the receiver is open-circuited from a load, the coupling relationship between each of the transmit coils 11 and the receive coil 21 may be acquired by the communication module. Upon start of charging, the receiver is connected to the load, and the coupling relationship between each of the transmit coils 11 and the receive coil 21 may be acquired by the detection module. The controller 14 may determine, based on the coupling relationship, the current parameters of each of the transmit coils 11. If a coupling between one of the transmit coils 11 and the receive coil 21 is stronger relative to couplings between the other transmit coils and the receive coil 21, the controller 14 determines that the current of the transmit coil 11 with the stronger coupling to the receive coil 21 is greater relative to the currents of the other transmit coils. For example, the controller 14 acquires the coupling between the first transmit coil 111 and the receive coil 21, and the coupling between the second transmit coil 112 and the receive coil 21 by the detection circuit 13. If the coupling between the first transmit coil 111 and the receive coil 21 is stronger, and the coupling between the second transmit coil 112 and the receive coil 21 is weaker, the controller 14 then determines that a current magnitude of the first transmit coil 111 is greater, and determines that a current magnitude of the second transmit coil 112 is smaller.

Figure 2B:
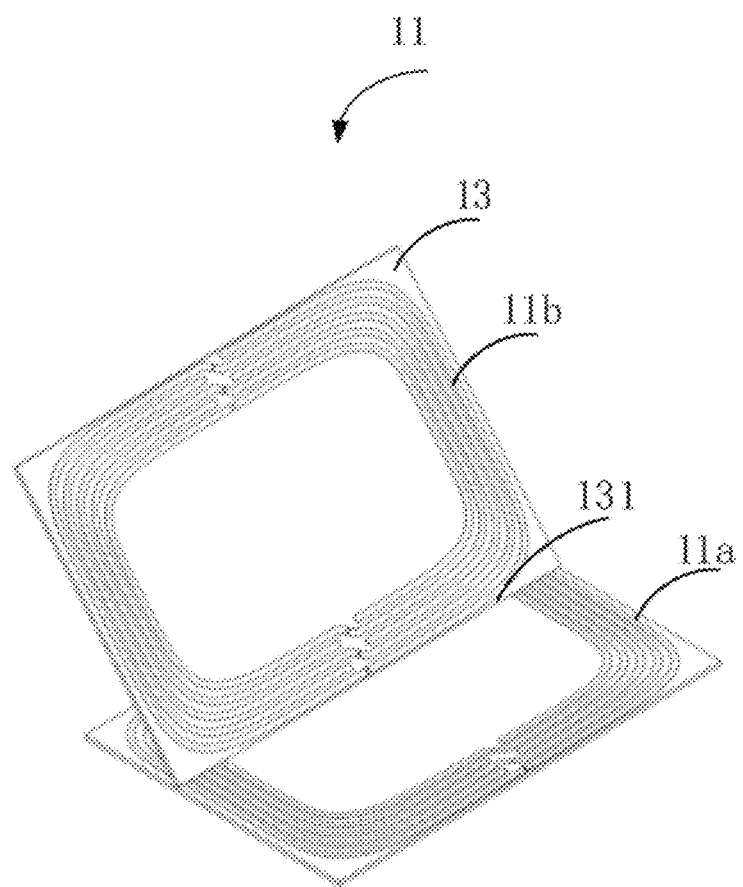
FIG. 2b is a structural diagram of two transmit coils according to an embodiment of the present disclosure.
Figure 2C:
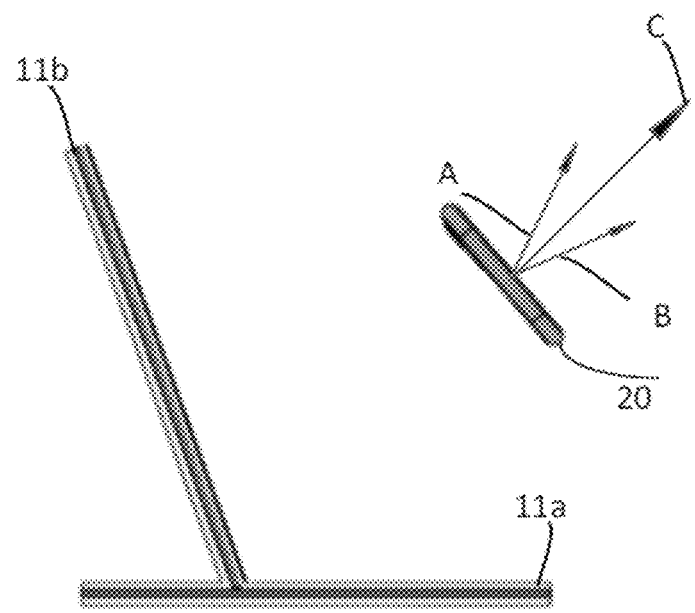
FIG. 2c is a diagram illustrating magnetic fields and superimposed magnetic fields generated by two transmit coils according to an embodiment of the present disclosure.

Even if a receiver is charged in different spatial postures, the wireless charging transmitter system 10 may correspondingly separately control each of the transmit circuit units 12 based on the coupling relationship between each of the transmit coils 11 and the receive coil 21 in a current posture, and thus supply a suitable current to each of the transmit coils 11. The current of each of the transmit coils 11 generates a corresponding magnetic field, and generates a superimposed magnetic field at the receiver. The superimposed magnetic field may have an even greater amplitude relative to a magnetic field generated by a single transmit coil 11. In addition, the transmit coil 11 may be better matched with the receive coil 21 in terms of orientation, and thus a better coupling therebetween may be achieved. In this way, when the receiver is being charged in the current posture, under a collaborative effect by the stronger magnetic field and the better coupling, the system is capable of achieving higher energy transmission efficiency. For example, as illustrated in FIG. 2b, FIG. 2b illustrates a structure of the transmit coil according to an embodiment of the present disclosure. The at least two transmit coils 11 include a first planar coil 11a and a second planar coil 11b. The plane where the first planar coil 11a is disposed is a first plane, and the plane where the second planar coil 11b is disposed is a second plane. The first planar coil 11a is horizontally disposed, and the first plane and the second plane are intersected to form an intersection line 171. The first planar coil 11a is intersected with the second planar coil 11b. The second planar coil 11b is disposed on a side of the first plane coil 11a. Respective support structures 17 (which are printed circuit boards, PCBs herein) of these two planar coils are mechanically connected. The intersection line 171 of the two coils is an intersection line between the circuit boards. Magnetic fields generated by the first planar coil 11a and the second planar coil 11b are as illustrated in FIG. 2c. The magnetic field generated by the first planar coil 11a is a magnetic field A, and the magnetic field generated by the second planar coil 11b is a magnetic field B. A superimposed magnetic field generated by these two magnetic fields in the wireless charging receiver system 20 (a mobile phone is used as an example in the drawings) is a magnetic field C. The superimposed magnetic field may have an even greater amplitude relative to the single magnetic field A and the single magnetic field B, and thus the transmit coil 11 may be better matched with the receive coil 21 in terms of orientation. In this way, a better coupling therebetween may be achieved. As a result, the system is capable of achieving higher energy transmission efficiency.

The detection circuit 13 measures a plurality of physical quantities of the transmit circuit units 12, and transmits a detection signal to the controller 14 to assist the controller 14 to control an operating state of the system. Signals acquired by the detection circuit 13 include, but are not limited to, direct-current input voltages and currents, and alternating-current output voltages and currents of the transmit circuit units 12. In some embodiments, a plurality of detection circuits 13 may be employed, and each of the transmit circuit units 12 corresponds to one detection circuit 13.

Therefore, the wireless charging transmitter system 10 may separately control, based on the coupling relationship, the current output by each of the transmit circuit units 12, and hence separately control the current parameters of each of the transmit coils 11, such that the transmit coils 11 simultaneously operate based on the current parameter, and generate the superimposed magnetic fields, thereby better transmitting electrical energy to the receive coil 21. In this way, the receive coil 21 is capable of better receiving the electrical energy, and thus higher energy transmission efficiency is achieved.

In some embodiments, at least two transmit coils 11 may be specifically designed such that orientations of the magnetic fields generated by the at least two transmit coils 11 are not parallel to each other or even orthogonal to each other, and phases of the currents between the transmit coils 11 are coherent. That is, relative phases of the current of the transmit coils 11 are stable. In some embodiments, a coupling coefficient of the magnetic fields between the transmit coils 11 is less than a predetermined threshold or even reaches a zero coupling, to reduce impacts caused by self-couplings between the transmit coils 11.

In some embodiments, the controller 14 may be a general processor, a digital signal processor (DSP), an application specific integrated circuit (ASIC), a field programmable gate array (FPGA), a microcontroller unit, an Acorn RISC machine (ARM), or another programmable logic device, a discrete gate or transistor logic device, or a discrete hardware component or a combination of these components. Further, the controller 14 may also be any traditional processor, controller, microcontroller, or state machine. The controller 14 may also be practiced as a combination of computing devices, for example, a combination of a DSP and a microprocessor, a plurality of microprocessors, one or more microprocessors plus a DSP core, and/or any other such configuration.

Figure 3:
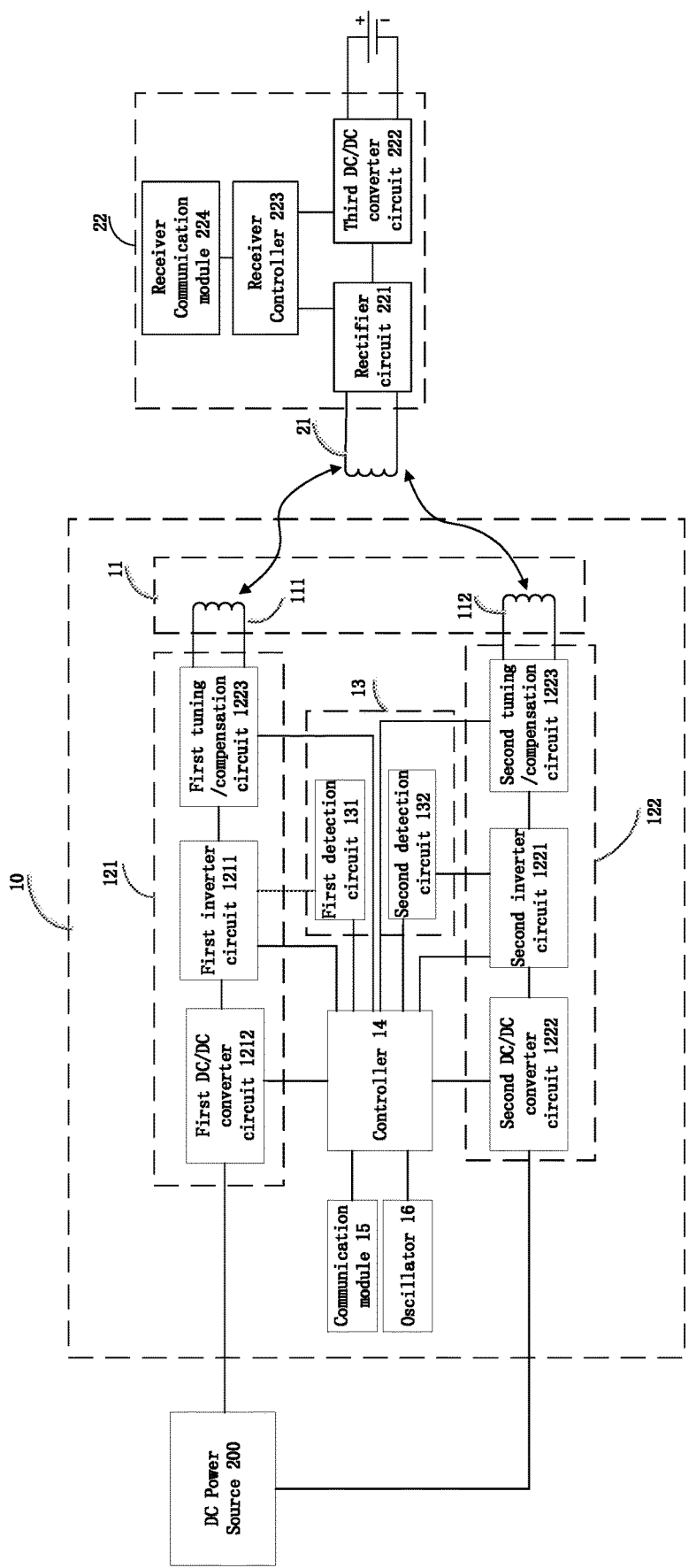
FIG. 3 is a structural diagram of a wireless charging transmitter system according to another embodiment of the present disclosure.

Referring to FIG. 3, FIG. 3 illustrates a wireless charging transmitter system 10 according to an embodiment of the present disclosure. FIG. 3 uses two transmit circuit units and two transmit coils as examples. The first transmit circuit unit 121 in the wireless charging transmitter system 10 includes a first inverter circuit 1211. The first inverter circuit 1211 is electrically connected to the first transmit coil 111, the controller 14, and the direct-current power source 200, and is configured to convert a direct current output by the direct-current power source 200 to an alternating current, and transmit the alternating current to the first transmit coil 111. Likewise, the second transmit circuit unit 122 includes a second inverter circuit 1221. The second inverter circuit 1221 is electrically connected to the second transmit coil 112, the controller 14, and the direct-current power source 200, and is configured to convert a direct current output by the direct-current power source 200 to an alternating current, and transmit the alternating current to the second transmit coil 112. Each of the transmit circuit units 12 includes an inverter circuit. One inverter circuit corresponds to one transmit coil 11. The controller 14 directly supplies a drive signal to the inverter circuit to drive the inverter circuit to operate. The drive signal may be a switch signal subjected to pulse width modulation (PWM). The pulse width modulated signals supplied to the inverter circuits are all based on the same frequency signal, and phase coherence is ensured. The controller 14 may adjust phases between the pulse width modulated signals supplied to the inverter circuits, to control the current phase relationship between each of the transmit coils 11 and hence to adjust an orientation of the generated combined magnetic field. In addition, the detection circuit 13 includes a first detection circuit 131 and a second detection circuit 132. The first detection circuit 131 is electrically connected to the first inverter circuit 1211 and the controller 14. The second detection circuit 132 is electrically connected to the second inverter circuit 1221 and the controller 14. The signals acquired by the detection circuit 13 may include the input impedance of the equivalent load at the output port of the inverter circuit, may include the amplitude, phase and the like of the input impedance of the equivalent load, or may include the temperature signal of the system, the direct-current input voltage and current and the like of the inverter circuit. For example, the first detection circuit 131 detects a first input impedance of the equivalent load at the output port of the first inverter circuit 1211, and the second detection circuit 132 detects a second input impedance of the equivalent load at the output port of the second inverter circuit 1221. In addition, the first input impedance and the second input impedance are both transmitted to the controller 14, such that the controller 14 processes and analyzes the impedances. The input impedance of the equivalent load detected by the detection circuit 13 may reflect the coupling relationship between the transmit coil 11 and the receive coil 21.

In some embodiments, the first transmit circuit unit 121 further includes a first DC/DC converter circuit 1212. The first DC/DC converter circuit 1212 is electrically connected to the direct-current power source 200, the first inverter circuit 1211, and the controller 14, and is configured to convert the output voltage of the direct-current power source 200 and transmit the converted voltage to the first inverter circuit 1211. Likewise, the second transmit circuit unit 122 further includes a second DC/DC converter circuit 1222. The second DC/DC converter circuit 1222 is electrically connected to the direct-current power source 200, the second inverter circuit 1221, and the controller 14, and is configured to convert an output voltage of the direct-current power source 200 and transmit the converted voltage to the second inverter circuit 1221. The first DC/DC converter circuit 1212 and the second DC/DC converter 1222 may achieve an up converting or down converting effect, and buck and boost the output voltage of the direct-current power source 200 to obtain a suitable direct-current voltage. The direct-current voltage then acts on the first inverter circuit 1211 and the second inverter circuit 1221, and the first inverter circuit 1211 and the second inverter circuit 1221 convert the voltage. The controller 14 may control the first DC/DC converter circuit 1212 and the second DC/DC converter circuit 1222 to convert input direct-current voltages supplied to the first inverter circuit 1211 and the second inverter circuit 1221, and hence to control amplitudes of currents supplied by the first inverter circuit 1211 and the second inverter circuit 1221 to the first transmit coil 111 and the second transmit coil 112.

In some embodiments, before the start of charging, when the receiver is disconnected from the load, the transmit coils are excited individually to transmit electrical energy to the receive coil. The receive coil receives the electrical energy, and transmits received electrical energy signals to the controller of the wireless charging transmitter by the communication module 15 in a fashion of receiving parameters by the receive coil. The controller determines the coupling strength between each of the transmit coils and the receive coil based on the receive parameters of the receive coil, and hence determines the current magnitude for each of the transmit coils.

In some embodiments, if the at least two transmit coils 11 have three coils or more coils, each of the transmit coils 11 corresponds to one transmit circuit unit 12, and in each of the transmit circuit units 12, the DC/DC converter circuit is power supplied by the same direct-current power source 200.

In some embodiments, the first transmit circuit unit 121 further includes a first tuning/compensation circuit 1213. The first tuning/compensation circuit 1213 is electrically connected to the first inverter circuit 1211, the first transmit coil 111, and the controller 14, and is configured to tune and compensate for the first transmit coil 111. Likewise, the second transmit circuit unit 122 further includes a second tuning/compensation circuit 1223. The second tuning/compensation circuit 1223 is electrically connected to the second inverter circuit 1221, the second transmit coil 112, and the controller 14, and is configured to tune and compensate for the second transmit coil 112. The first transmit coil 111 and the first inverter circuit 1211 are coupled to each other by the first tuning/compensation circuit 1213, and the second transmit coil 112 and the second inverter circuit 1221 are coupled to each other by the second tuning/compensation circuit 1223. In some embodiments, the tuning/compensation circuit is formed of a fixed passive device, and statically tunes and compensates for the transmit coils 11. In some embodiments, the tuning/compensation circuit includes an active device (for example, a switch), and dynamically tunes the transit coils. The controller 14 may dynamically adjust the tuning/compensation circuit based on detection information (for example, the input impedance of the equivalent load of the inverter circuit) provided by the detection circuit 13, such that the inverter circuit is capable of more efficiently operation.

In some embodiments, the wireless charging transmitter system 10 further includes an oscillator 16. The oscillator 16 is electrically connected to the controller 14, and is configured to supply a clock signal. The controller 14 may transmit the clock signal supplied by the oscillator 16 to the inverter circuit of each of the transmit circuit units 12 as a reference for generating the drive signal. In the process of re-assigning clock signals by the controller 14, a delay between two reference signals may be adjusted to control the current phase and the orientations of spatial magnetic fields of the transmit coils 11.

In some embodiments, the internal circuit 22 of the receiver system includes a rectifier circuit 221, a third DC/DC converter circuit 222, a receiver controller 223, and a receiver communication module 224. The receiver controller 223 is configured to control the rectifier circuit 221 to convert alternating-current power received by the receive coil 21 to direct-current power. The third DC/DC converter circuit 222 is configured to convert the direct-current power to direct-current power with a specific voltage/current for charging the load 300 (which is a battery in the drawings). The receiver controller 223 is further configured to transmit information by the receiver communication module 224 and the wireless charging transmitter system 10.

Still referring to FIG. 3, the wireless charging transmitter system 10 operates in accordance with the following principles.

For assessment of the coupling between each of the transmit coil 11 and the receive coil and for subsequent separate regulation of the current of each of the transmit coils 11, each of the transmit coils 11 exclusively corresponds to one transmit circuit unit 12. Using two transmit circuit units and two transmit coils as examples, the controller 14 may sequentially excite the transmit coils 11 by controlling the two transmit circuit units 12, and then receive a received signal parameter (for example, an output voltage of the rectifier of the receiver) fed back by the receiver by the communication module 15. The controller hence determines the coupling relationship between each of the transmit coils 11 and the receive coil 21 based on the received signal parameter. When the two transmit circuit units 12 and the two transmit coils 11 are simultaneously operating, the coupling relationship between each of the transmit coils 11 and the receive coil 21 may be detected by the detection circuit 13. The controller 14 calculates a suitable combination of the currents of the two transmit coils 11 based the coupling relationship, determines the current parameters of the two transmit coils 11, and controls the current output by each of the transmit circuit units 12 by controlling the output voltages of two DC/DC converter circuits and the phase between the clock/PWM signals supplied to the two inverter circuits, to control the current parameters of the two transmit coils 11. In this way, the orientations and the amplitudes of the spatial magnetic fields are adjusted, and a higher charging efficiency and/or a greater charging distance are achieved.

Therefore, the wireless charging transmitter system 10 may control, based on the coupling relationship between each of the transmit coils 11 and the receive coil 21, the current output by each of the transmit circuit units 12, to control the current parameters of each of the transmit coils 11, such that the transmit coils 11 collaboratively operate, and a suitable current combination is achieved. In this way, the orientations and the amplitudes of the spatial magnetic fields are optimized, and a higher charging efficiency, a greater charging distance, and more spatial postures of the receiver are achieved and supported.

Figure 4:
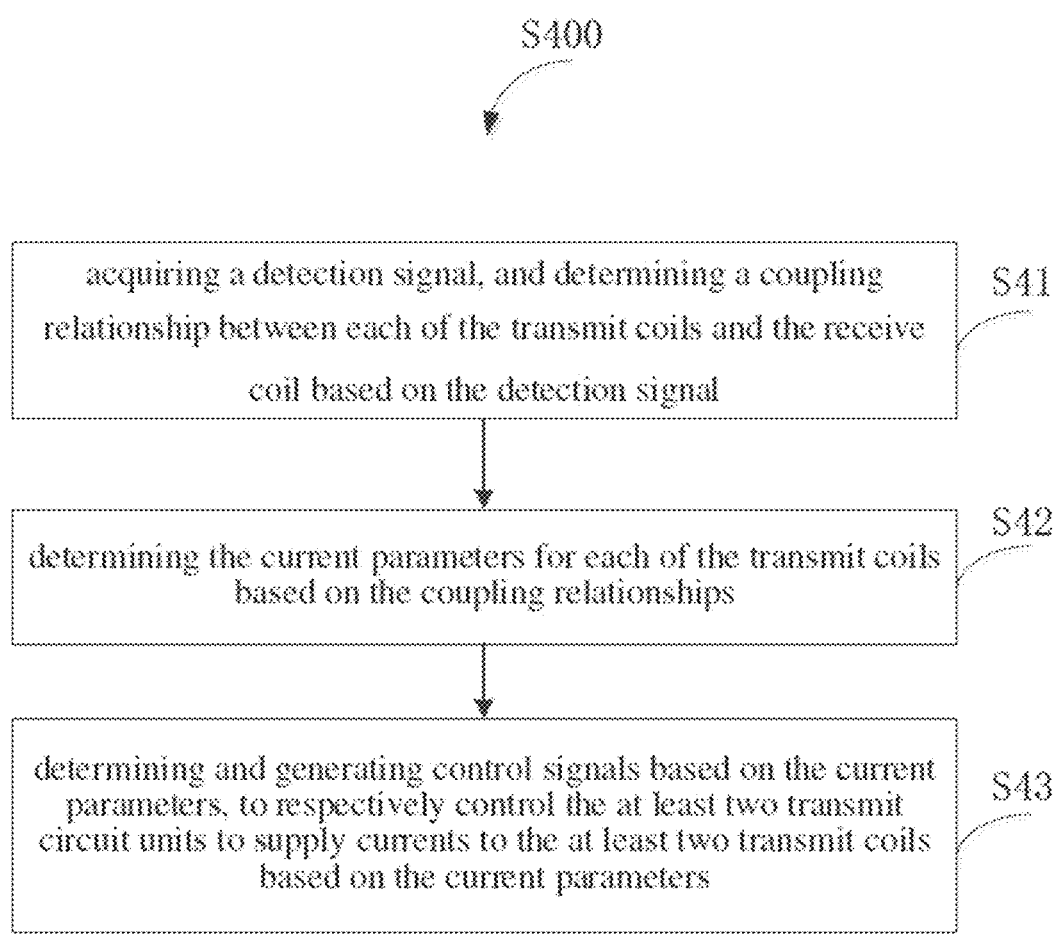
FIG. 4 is a flowchart of a method for controlling a wireless charging transmitter according to an embodiment of the present disclosure.

Referring to FIG. 4, FIG. 4 illustrates a method 400 for controlling a wireless charging transmitter, applicable to the wireless charging transmitter system as described above. As illustrated in FIG. 4, the method S400 for controlling the wireless charging transmitter includes the following steps.

Step S41 includes acquiring a detection signal, and determining a coupling relationship between each of the transmit coils and the receive coil based on the detection signal.

Step S42 includes determining the current parameters for each of the transmit coils based on the coupling relationship.

Step S43 includes determining and generating a control signal based on the current parameters, to respectively control the at least two transmit circuit units to supply a current to the at least two transmit coils based on the current parameters.

In the method, the current parameters of each of the transmit coils may be determined based on the coupling relationship. The controller determines and generates the control signal based on the determined current parameter, and controls, based on the control signal, at least two transmit circuit units to supply currents to the at least two transmit coils based on the current parameters to achieve a suitable current combination. In this way, optimized amplitudes and orientations of superimposed magnetic fields are achieved, and thus wireless transmission efficiency of electrical energy is improved and more charging postures of a receiver are supported.

In some embodiments, the coupling relationship includes the coupling strength. The current parameters include a current magnitude. The detection signals may be signals acquired by the detection circuit. The signal may be an input impedance of the equivalent load of an inverter circuit. The input impedance reflects the coupling strength between the corresponding transmit coil and the receive coil. When the magnitudes of output currents of the inverter circuits are equal and the phases of the output currents are the same, the input impedance is proportional to the coupling strength. The higher the input impedance, the greater the coupling strength. That is, the coupling is stronger. Therefore, the controller may determine the coupling strength between each of the transmit coils and the receive coil based on the detection signal, and determine the current magnitude for each of the transmit coils based on the coupling strength, such that the transmit circuit units supply power to the transmit coils based on the corresponding current magnitudes. In addition, the controller may adjust the parameters of the tuning/compensation circuit based on the input impedance of the equivalent load of the inverter circuit, such that the inverter circuit operates more efficiently, and the transmit coils are dynamically tuned and compensated.

In some embodiments, when the receiver is disconnected from the load, the detection signals include received signal parameters of the receive coils, and the detection signals may be acquired by the communication module. The controller may likewise determine the coupling strength between each of the transmit coils and the receive coil based on the received signal parameter, and hence determine the current magnitude for each of the transmit coils.

In some embodiments, the greater the coupling strength, the higher the current magnitude of the corresponding transmit coil. In some other embodiments, the current for the transmit coil is proportional to the coupling strength.

In some embodiments, the control signal includes a first control signal. The first control signal is applied to a DC/DC converter circuit. The controller may adjust the current magnitude of each of the transmit coils by controlling the output voltage of the DC/DC converter circuit. Specifically, the controller determines the first control signal based on the current magnitude, and hence controls the current magnitude of each of the transmit coils, such that the strength of the spatial magnetic field generated by the current of each of the transmit coils is regulated and controlled. In this way, amplitudes of superimposed magnetic fields are optimized, and a higher charging efficiency is achieved.

In some embodiments, the coupling relationship includes a coupling effect relationship, and the current parameter includes a current phase relationship. If the detection signals are signals acquired by the communication module, the detection signal is a communication signal between each wireless charging transmitter system and the wireless charging receiver system, which may reflect the coupling effect relationship between each of the transmit coils and the receive coil. Therefore, step S41 includes step S411.

Step S411 includes determining a coupling effect relationship between each of the transmit coils and the receive coil based on the detection signal.

The controller may determine a coupling effect relationship between each of the transmit coils and the receive coil based on the detection signal, and determine the current phase relationship between the transmit coils based on the coupling effect relationship to control the orientation of the magnetic field generated by the current of each of the transmit coils. In this way, orientations of superimposed magnetic fields are optimized, and hence more spatial postures of the receiver are supported. Therefore, step S42 includes step S421.

Step S421 includes determining a current phase relationship between the transmit coils based on the coupling effect relationship.

In some embodiments, the detection signal includes a received signal parameter of the receive coil, which reflects receiving performance of the receive coil. The wireless charging receiver system includes a rectifier circuit, which converts an alternating current received by the receive coil to a direct current. The direct current is then converted by the DC/DC converter circuit in the wireless charging receiver system to direct-current power with a specific voltage/current for charging a battery. Before the charging system starts operating and before charging of the receiver, the rectifier circuit of the wireless charging receiver system is almost disconnected from the load. If the transmitter controls the transmit circuit units to drive the corresponding transmit coils at a specific alternating-current magnitude, an alternating-current voltage is induced due to the coupling between the receive coil and the transmit coil, which is then rectified to direct-current voltage by the rectifier circuit. The wireless charging receiver system then initiates the communication module thereof to report the direct-current voltage to the wireless charging transmitter system. The direct-current voltage is the received signal parameter, and the magnitude of the direct-current voltage reflects the receiving performance of the receive coil.

Figure 5:
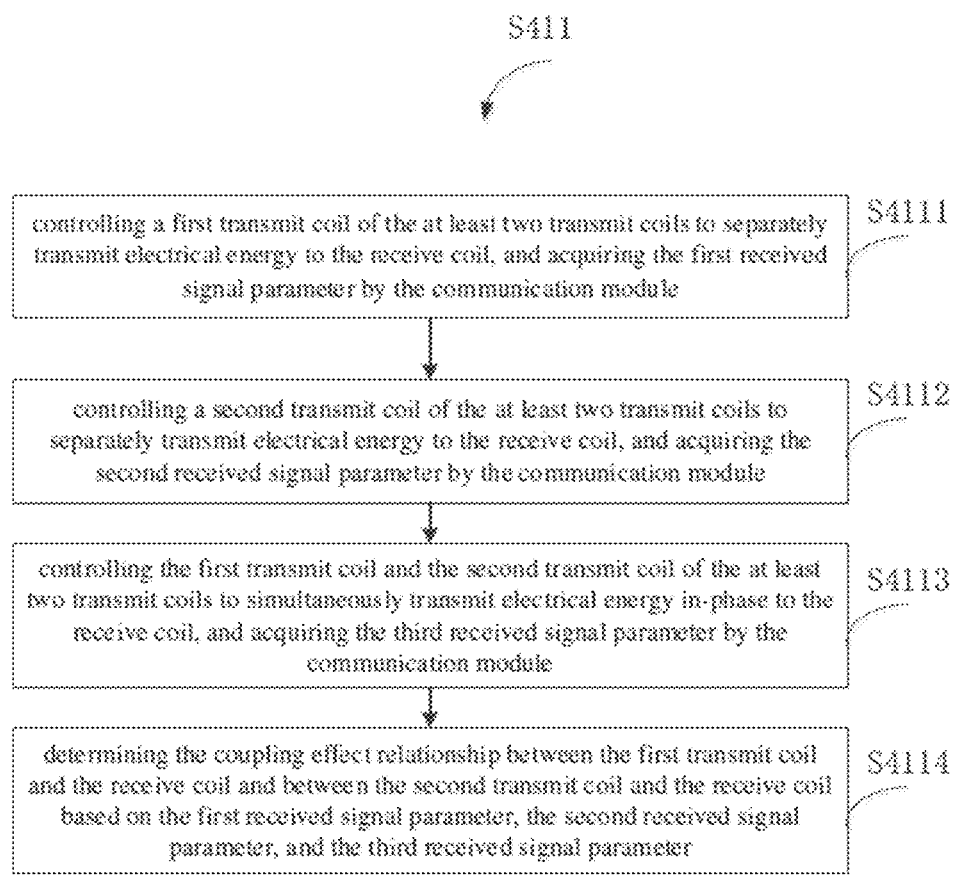
FIG. 5 is a flowchart of step S411 according to an embodiment of the present disclosure.

In some embodiments, the received signal parameter includes a first received signal parameter, a second received signal parameter, and a third received signal parameter. Referring to FIG. 5, step S411 includes steps S4111, S4112, S4113 and S4111.

S4111 includes controlling a first transmit coil of the at least two transmit coils to separately transmit electrical energy to the receive coil, and acquiring the first received signal parameter by the communication module.

S4112 includes controlling a second transmit coil of the at least two transmit coils to separately transmit electrical energy to the receive coil, and acquiring the second received signal parameter by the communication module.

S4113 includes controlling the first transmit coil and the second transmit coil of the at least two transmit coils to simultaneously transmit electrical energy in-phase to the receive coil, and acquiring the third received signal parameter by the communication module.

S4114 includes determining the coupling effect relationship between the first transmit coil and the receive coil and between the second transmit coil and the receive coil based on the first received signal parameter, the second received signal parameter, and the third received signal parameter.

The above steps may be all performed before the system starts charging. The received signal parameter may be a received voltage, or a received current. The coupling effect relationship between each of the transmit coils and the receive coil may be determined based on the first received signal parameter, the second received signal parameter, and the third received signal parameter.

Figure 6:
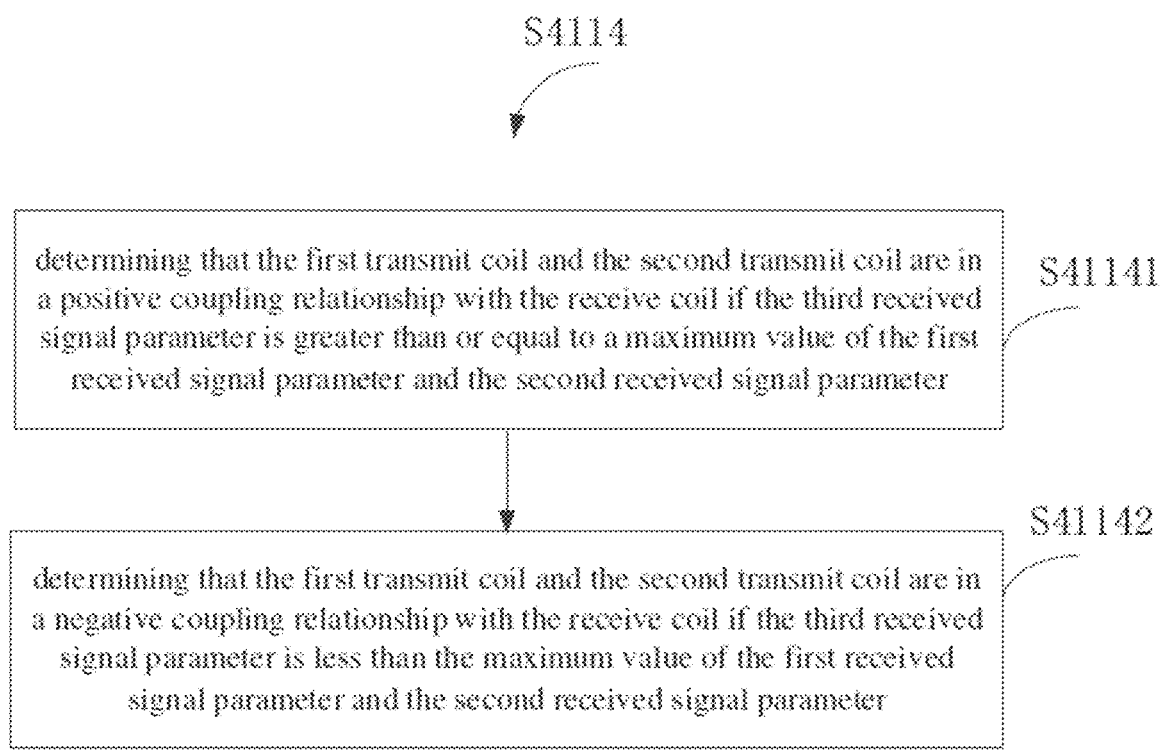
FIG. 6 is a flowchart of step S4114 in FIG. 5.

In some embodiments, the coupling effect relationship includes a positive coupling relationship and a negative coupling relationship. Referring to FIG. 6, step S4114 includes steps S41141 and S411142.

S41141 includes determining that the first transmit coil and the second transmit coil are in a positive coupling relationship with the receive coil if the third received signal parameter is greater than or equal to a maximum value of the first received signal parameter and the second received signal parameter.

S41142 includes determining that the first transmit coil and the second transmit coil are in a negative coupling relationship with the receive coil if the third received signal parameter is less than the maximum value of the first received signal parameter and the second received signal parameter.

The positive coupling relationship indicates that the greater the current of the transmit coil, the greater the current received by the receive coil. The negative coupling relationship indicates that the greater the current of a transmit coil, the smaller the total current received by the receive coil.

Figure 7:
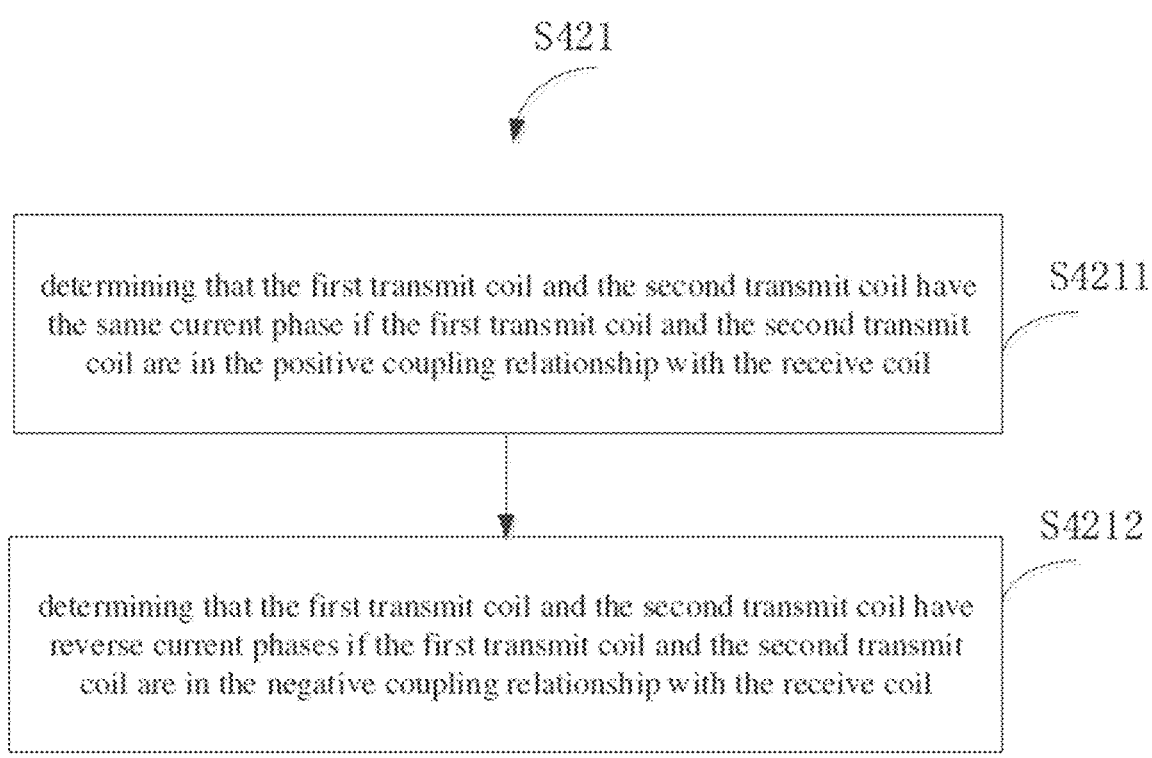
FIG. 7 is a flowchart of step S421 according to an embodiment of the present disclosure.

Before the system starts operating and before receiver starts charging, the current phase relationships between the transmit coils are determined based on the coupling effect relationship. Referring to FIG. 7, step S421 includes steps S4211 and S4212.

S4211 includes determining that the first transmit coil and the second transmit coil have the same current phase if the first transmit coil and the second transmit coil are in the positive coupling relationship with the receive coil.

S4212 includes determining that the first transmit coil and the second transmit coil have reverse current phases if the first transmit coil and the second transmit coil are in the negative coupling relationship with the receive coil.

The phase relationships between the transmit coil currents are determined based on the coupling relationships between the transmit coils and the receive coil, such that the superimposed magnetic fields of the currents of the transmit coils have an even greater amplitude relative to the magnetic field generated by the current of a single transmit coil, and the orientations of the superimposed magnetic fields are more suitable, which facilitates receiving of the electrical energy by the receive coil.

For better description on how to determine the coupling relationship between each of the transmit coils and the receive coil based on the detection signals, and how to determine the current parameters for each of the transmit coils based on the coupling relationships, some examples are given hereinafter. Before charging of the receiver starts, the load 300 of the rectifier circuit of the receiver is nearly disconnected from the receiver. First, a first transmit circuit unit of the at least two transmit circuit units generates a specific alternating current (for example, a current of one ampere) to drive the first transmit coil of the at least two transmit coils, such that the first transmit coil transmits electrical energy to the receive coil individually. In this case, an alternating-current voltage is induced on the receiver side through the coupling between the receive coil and the first transmit coil, and then the receiver converts the received alternating-current voltage to a direct-current voltage Va using the rectifier circuit. The receiver then starts the communication module thereof to report the direct-current voltage Va to the controller of the transmitter.

Second, a second transmit circuit unit of the at least two transmit circuit units generates a specific alternating current (for example, a current of one ampere) to drive the second transmit coil of the at least two transmit coils, such that the second transmit coil transmits electrical energy to the receive coil individually. In this case, an alternating-current voltage is induced on the receiver side through the coupling between the receive coil and the second transmit coil, and then the receiver converts the received alternating-current voltage to a direct-current voltage Vb using the rectifier circuit. The receiver starts the communication module thereof to report the direct-current voltage Vb to the controller of the transmitter.

Finally, the first transmit circuit unit and the second transmit circuit unit drive the first transmit coil and the second transmit coil in-phase simultaneously by a specific alternating current (for example, a current of one ampere). In this case, the receiver senses the alternating-current voltage induced on the receiver side through the couplings between the receive coil and the first transmit coil and between the receiver coil and the second transmit coil, and then the receiver converts the received alternating-current voltage to a direct-current voltage Va+b using the rectifier circuit. The receiver starts the communication module thereof to report the direct-current voltage Va+b to the controller of the transmitter.

The controller of the transmitter compares the three voltages and acquires several key control parameters. The ratio of Va to Vb is approximately equal to the ratio of the coupling between the receive coil and the first transmit coil to the coupling between the receiver coil and the second transmit coil. The current magnitude for the corresponding transmit coil is determined based on Va and Vb. The currents may be allocated based on the ratio so as to achieve better system efficiency. The transmit coil with a greater coupling coefficient is allocated with a greater current.

If Va+b is greater than or equal to Max(Va, Vb), the couplings between the receiver coil and the two transmit coils are in a positive coupling relationship. That is an in-phase relationship. In this case, when the current parameters for the two transmit coils are determined, the two transmit coils are driven in-phase, and it is determined that the currents of the two transmit coils have the same phase. If Va+b is less than Max(Va, Vb), the couplings between the receive coil and the two transmit coils are in a negative coupling relationship. That is an out of phase relationship. In this case, when the current parameters for the two transmit coils are determined, the two transmit coils are driven 180 degrees out of phase, and it is determined that the currents of the two transmit coils have opposite phases.

After a suitable combination (in-phase or out-of-phase, and amplitude ratios) of the current parameters of the transmit coils are determined, the controller of the transmitter controls the transmit circuit units to drive the two transmit coils based on the combination, and the receiver turn on the charging circuit to start the charging of the battery. The receiver reports in real time the output voltage of the rectifier to the transmitter by the communication module. The transmitter adjusts the amplitudes and the phases of the transmit coils based on the previously determined current ratios (Va/Vb) by controlling the two transmit circuit units, such that the output voltage of the rectifier circuit of the receiver is relatively stable. In this way, the amplitudes and the orientations of the superimposed magnetic fields are optimized, and a better charging efficiency can be achieved.

During the process of charging, if the position of the receiver changes, the change may be reflected by the input impedances of the equivalent loads of the two inverter circuits detected by the two detection circuits of the transmitter. An increase in the real part of the input impedance of the equivalent load indicates the coupling between the corresponding transmit coil and the receive coil becomes stronger. A decrease in the real part of the input impedance of the equivalent load indicates the coupling between the corresponding transmit coil and the receive coil becomes weaker. According to such changes, the ratio (likewise, the stronger the coupling, the greater the current) of the currents for the two transmit coils may be adjusted to "track" the receiver, and charging efficiency can be further improved.

In some embodiments, after the current phase relationship between the transmit coils is determined, a control signal is determined, and the controller adjusts current phases of transmit coils based on the control signal. The control signal includes a second control signal. The second control signal is configured to drive the inverter circuit. More particularly, the phase of the second control signal is determined based on the current phase relationship. If the second control signal is a PWM signal, the controller adjusts, according to needs of collaborative operation of the transmit coils, phases between the PWM signals supplied to the inverter circuits, to control the current phase relationship of each of the transmit coils so as to adjust an orientation of a generated combined magnetic field.

In some embodiments, the controller acquires the clock signal supplied by the oscillator, and uses the clock signal as a reference signal for generating the second control signal. That is, the controller may transmit the clock signal supplied by the oscillator to the inverter circuit of each of the inverter circuits as a reference for generating the drive signal. In the process of assigning clock signals, the controller may adjust a delay between at least two reference signals to control the current phases and the orientations of spatial magnetic fields of the transmit coils.

In summary, in the method for controlling the wireless charging transmitter, the coupling between the receiver coil and each of the transmit coils is assessed and updated in real time based on the detection signal, and hence an amplitude ratio and a phase relationship between the currents supplied to each of the transmit coils and a suitable current combination is determined. In this way, proper amplitudes and orientations of the superimposed magnetic fields are determined, such that multiple transmit coils collaboratively operate to wirelessly charge the receiver, thereby improving wireless transmission efficiency of electrical energy and supporting different charging postures of the receiver device.

It should be noted that in the above various embodiments, the steps are not subject to a definite order during execution, and persons of ordinary skill in the art would understand, based on the description of the embodiments of the present disclosure, in different embodiments, the above steps may be performed in different orders, that is, may be concurrently performed, or alternately performed.

In another aspect of the embodiments of the present disclosure, an embodiment of the present disclosure provides an apparatus for controlling a wireless charging transmitter. The apparatus may be a software module. The software module includes several instructions which are stored in a memory. A processor is capable of accessing the memory. The processor, when calling and executing the instructions, is caused to perform the method for controlling the wireless charging transmitter according to the above embodiments.

In some embodiments, the apparatus may also be constituted by hardware devices. For example, the apparatus may be constituted by one or more than two chips. The chips collaboratively operate to perform the method for controlling the wireless charging transmitter according to the above embodiments. Still for example, the apparatus for controlling the wireless charging transmitter may also be constituted by various types of logic devices, for example, a general purpose processor, a digital signal processor (DSP), an application specific integrated circuit (ASIC), a field programmable gate array (FPGA), a microcontroller unit, an Acorn RISC machine (ARM), or another programmable logic device, a discrete gate or transistor logic device, or a discrete hardware component or a combination of these components.

Figure 8:
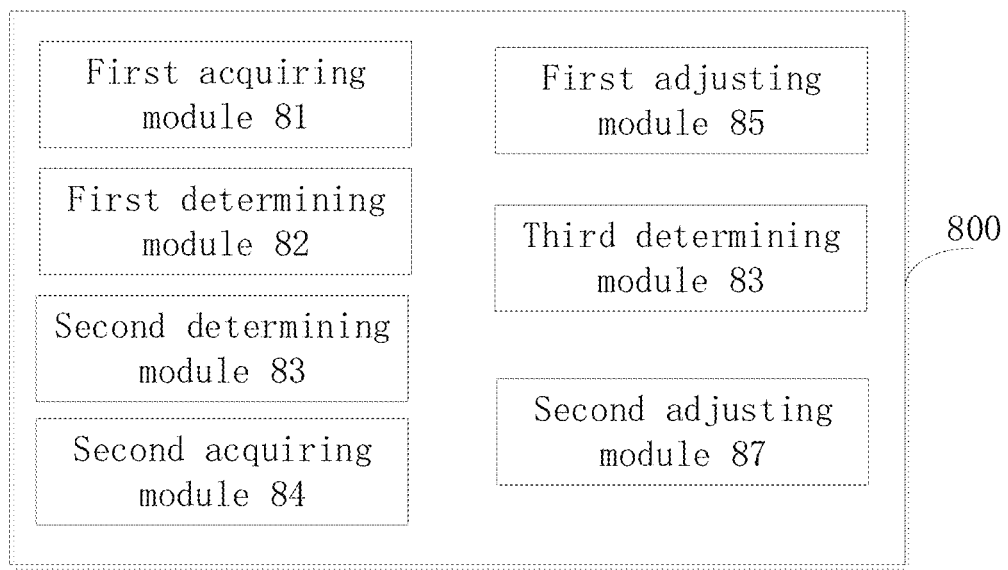
FIG. 8 is a structural diagram of an apparatus for controlling a wireless charging transmitter according to an embodiment of the present disclosure.

Referring to FIG. 8, FIG. 8 illustrates an apparatus 800 for controlling a wireless charging transmitter. The apparatus 800 includes a first acquiring module 81, a first determining module 82, and a second determining module 83.

The first acquiring module 81 is configured to acquire a detection signal, and determine a coupling relationship between each of the transmit coils and the receive coil based on the detection signal.

The first determining module 82 is configured to determine the current parameter for each of the transmit coils based on the coupling relationship.

The second determining module 83 is configured to determine and generate a control signal based on the current parameters, to respectively control the at least two transmit circuit units to supply currents to the at least two transmit coils based on the current parameters.

Therefore, in the apparatus for controlling the wireless charging transmitter, the current parameters of each of the transmit coils may be determined based on the coupling relationship. The controller determines and generates the control signal based on the determined current parameter, and controls, based on the control signal, at least two transmit circuit units to supply currents to the at least two transmit coils based on the current parameters to achieve a suitable current combination. In this way, optimized amplitudes and orientations of superimposed magnetic fields are achieved, and thus wireless transmission efficiency of electrical energy is improved and more charging postures of a receiver are supported.

In some embodiments, the coupling relationship includes a coupling strength, and the current parameters includes a current magnitude; and the first acquiring module 81 is specifically configured to determine a coupling strength between each of the transmit coils and the receive coil based on the detection signal; and the first determining module 82 is specifically configured to determine a current magnitude of each of the transmit coils based on the coupling strength.

In some embodiments, the detection signal includes an input impedance of the equivalent load of the inverter circuit.

In some embodiments, the input impedance is proportional to the coupling strength.

In some embodiments, the greater the coupling strength, the greater the current magnitude for the transmit coil.

In some embodiments, the detection signal includes a received signal parameter of the receive coil.

In some embodiments, the control signal includes a first control signal. The first control signal is applied to the DC/DC converter circuit. The second determining module 83 is specifically configured to determine the first control signal based on the current magnitude to control an output voltage of the DC/DC converter circuit.

In some embodiments, the coupling relationship includes a coupling effect relationship, and the current parameter includes a current phase relationship. The first determining module 82 is specifically configured to determine a coupling effect relationship between each of the transmit coils and the receive coil based on the detection signal.

The first determining module 82 is specifically configured to determine the current parameters of each of the transmit coils based on the coupling relationship.

The first determining module 82 is specifically configured to determine a current phase relationship between the transmit coils based on the coupling effect relationship.

In some embodiments, the received signal parameter includes a first received signal parameter, a second received signal parameter, and a third received signal parameter. The first determining module 82 is specifically configured to control a first transmit coil of the at least two transmit coils to individually transmit electrical energy to the receive coil, and acquire the first received signal parameter by the communication module. The first determining module 82 is specifically configured to control a second transmit coil of the at least two transmit coils to separately transmit electrical energy to the receive coil, and acquire the second received signal parameter by the communication module. The first determining module 82 is specifically configured to control the first transmit coil and the second transmit coil of the at least two transmit coils to simultaneously transmit electrical energy in-phase to the receive coil, and acquire the third received signal parameter by the communication module. The first determining module 82 is specifically configured to determine the coupling effect relationship between the first transmit coil and the receive coil and between the second transmit coil and the receive coil based on the first received signal parameter, the second received signal parameter, and the third received signal parameter.

In some embodiments, the coupling effect relationship includes a positive coupling relationship and a negative coupling relationship. It is determined that the first transmit coil and the second transmit coil are in a positive coupling relationship with the receive coil if the third received signal parameter is greater than or equal to a maximum value of the first received signal parameter and the second received signal parameter. It is determined that the first transmit coil and the second transmit coil are in a negative coupling relationship with the receive coil if the third received signal parameter is less than the maximum value of the first received signal parameter and the second received signal parameter.

In some embodiments, the first determining module 82 is specifically configured to determine that the first transmit coil and the second transmit coil have the same current phase if the first transmit coil and the second transmit coil are in the positive coupling relationship with the receive coil. The first determining module 82 is specifically configured to determine that the first transmit coil and the second transmit coil have reverse current phases if the first transmit coil and the second transmit coil are in the negative coupling relationship with the receive coil.

In some embodiments, the control signal includes a second control signal, the second control signal being configured to drive the inverter circuit. The second determining module 83 is specifically configured to determine a phase of the second control signal based on the current phase relationship.

In some embodiments, the apparatus 800 further includes a second acquiring module 84 configured to acquire the clock signal, and use the clock signal as a reference signal for generating the second control signal.

In some embodiments, the apparatus 800 further includes a first adjusting module 85 configured to adjust a delay between the reference signals based on the current phase relationship. The apparatus 800 further includes a third determining module 86 configured to determine the second control signal based on the reference signal and the delay between the reference signals.

In some embodiments, the second control signal is a PWM signal.

In some embodiments, the apparatus 800 further includes a second adjusting module 87 configured to adjust a parameter of the tuning/compensation circuit based on an input impedance of the equivalent load of the inverter circuit to dynamically tune and compensate for the transmit coil.

It should be noted that the above apparatus is capable of performing the method for controlling the wireless charging transmitter according to the embodiments of the present disclosure, has corresponding function modules for performing the method, and achieves the corresponding beneficial effects. For technical details that are not illustrated in detail in the apparatus embodiments, reference may be made to the description of the methods according to the embodiments of the present disclosure.

Figure 9:
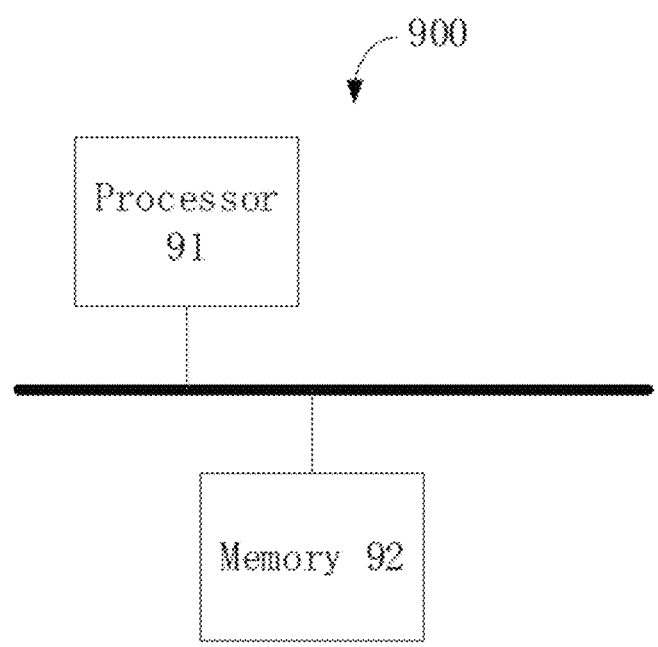
FIG. 9 is a structural diagram of a controller according to an embodiment of the present disclosure.

Referring to FIG. 9, FIG. 9 is a diagram of a controller 900 according to an embodiment of the present disclosure. As illustrated in FIG. 9, the controller 900 includes at least one processor 91 and a memory 92. FIG. 9 uses one processor 91 as an example.

The processor 91 and the memory 92 may be connected via a bus or in another manner, and FIG. 9 uses the bus as an example.

The memory 92, as a non-volatile computer-readable storage medium, may be configured to store non-volatile software programs, non-volatile computer-executable programs and modules, for example, the program instructions/modules corresponding to the method for controlling the wireless charging transmitter according to an embodiment of the present disclosure. The non-volatile software programs, instructions and modules stored in the memory 92, when executed, cause the at least one processor 91 to perform various function applications and data processing of the apparatus for controlling the wireless charging transmitter, that is, performing the method for controlling the wireless charging transmitter and implementing the functions of the modules or units in the above apparatus embodiments.

In addition, the memory 92 may include a high speed random access memory, or include a non-volatile memory, for example, at least one disk storage device, a flash memory device, or another non-volatile solid storage device. In some embodiments, the memory 92 optionally includes memories remotely configured relative to the processor 91. These memories may be connected to the processor 91 over a network. Examples of the above network include, but not limited to, the Internet, Intranet, local area network, mobile communication network and a combination thereof.

One or more instructions/modules are stored in the memory 92, and when being executed by the at least one processor 91, perform the method for controlling the wireless charging transmitter according to any of the above method embodiments.

An embodiment of the present disclosure provides a computer program product, wherein the computer program product includes at least one computer program stored in a non-volatile computer readable storage medium. The at least one computer program includes at least one program instruction, which, when executed by an electronic device, causes the electronic device to perform the method for controlling the wireless charging transmitter.

In summary, in the apparatus for controlling the wireless charging transmitter, the current parameter for each of the transmit coils may be determined based on the coupling relationships. The controller determines and generates the control signal based on the determined current parameters, and controls, based on the control signals, at least two transmit circuit units to supply currents to the at least two transmit coils based on the current parameters to achieve a suitable current combination. In this way, optimized amplitudes and orientations of superimposed magnetic fields are achieved, and thus wireless transmission efficiency of electrical energy is improved and more charging postures of a receiver are supported.

The above described apparatus or device embodiments are merely for illustration purpose only. The modules and units which are described as separate components may be physically separated or may be not physically separated, and the components which are illustrated as modules and units may be or may not be physical modules and units, that is, the components may be located in the same position or may be distributed into a plurality of network modules and units. A part or all of the modules may be selected according to the actual needs to achieve the objectives of the technical solutions of the embodiments.

According to the above embodiments of the present disclosure, a person skilled in the art may clearly understand that the embodiments of the present disclosure may be implemented by means of hardware or by means of software plus a necessary general hardware platform. Based on such understanding, portions of the technical solutions of the present disclosure that essentially contribute to the related art may be embodied in the form of a software product, the computer software product may be stored in a storage medium, such as a ROM/RAM, a magnetic disk, or a CD-ROM, including several instructions for causing a computer device (a personal computer, a server, or a network device) to perform the various embodiments of the present disclosure, or certain portions of the method of the embodiments.

Finally, it should be noted that the above embodiments are merely used to illustrate the technical solutions of the present disclosure rather than limiting the technical solutions of the present disclosure. Under the concept of the present disclosure, the technical features of the above embodiments or other different embodiments may be combined, the steps therein may be performed in any sequence, and various variations may be derived in different aspects of the present disclosure, which are not detailed herein for brevity of description. Although the present disclosure is described in detail with reference to the above embodiments, persons of ordinary skill in the art should understand that they may still make modifications to the technical solutions described in the above embodiments, or make equivalent replacements to some of the technical features; however, such modifications or replacements do not cause the essence of the corresponding technical solutions to depart from the spirit and scope of the technical solutions of the embodiments of the present disclosure.

A wireless power transfer system comprises a receive coil and at least two transmit coils magnetically coupled to the receive coil. A controller is configured to detect the coupling relationship between each of the at least two transmit coils and the receive coil. Based on the detected coupling relationships, the controller distributes currents into the at least two transmit coils accordingly. In some embodiments, there are two transmit coils. During the process of distributing the currents into the two transmit coils, the controller also detects the reflected impedance at the output of the inverter coupled to the corresponding transmit coil. The controller is configured to adjust the current distribution between the two transmit coils until the reflected impedance at the output of a first inverter coupled to a first transmit coil is equal to the reflected impedance at the output of a second inverter coupled to a second transmit coil. At this equilibrium point (e.g., the point where the reflected impedance at the output of the first inverter is equal to the reflected impedance at the output of the second inverter), the wireless power transfer system is able to achieve better efficiency.

The controller applies two different control loops to the wireless power transfer system. A fast control loop is employed to regulate the output voltage of the wireless power transfer system. A slow control loop is employed to adjust the current distribution so as to improve the efficiency of the wireless power transfer system.

The following examples describe the implementations for distributing currents to multiple transmit coils. The following examples further show that the proposed current distribution is capable of achieving the lowest losses in transmit coils, thereby achieving highest power transfer efficiency.

For simplicity, a wireless power transfer system having two transmit coils is discussed here. It should be noted that the methods discussed below is also applicable to a wireless power transfer system having more than two transmit coils simultaneously transmitting power to the receiver.

Figure 10:
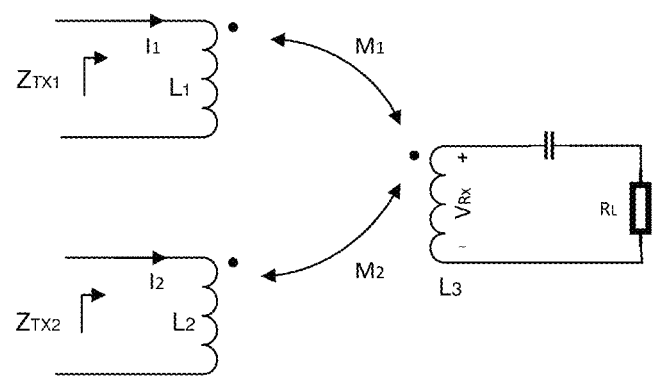
FIG. 10 is a simplified diagram of a wireless charging transmitter system according to an embodiment of the present disclosure.

FIG. 10 is a simplified diagram of a wireless charging transmitter system according to an embodiment of the present disclosure. The wireless charging transmitter system comprises a first transmit (TX) coil L1, a second transmit coil L2 and a receive (RX) coil L3. The coupling (mutual inductance) between the first transmit coil and the receive coil is denoted as $M_1$. The coupling (mutual inductance) between the second transmit coil and the receive coil is denoted as $M_2$. The current flowing through the first transmit coil is denoted as $I_1$. The current flowing through the second transmit coil is denoted as $I_2$. The voltage at the receiver side is denoted as $V_{Rx}$. The receive coil is connected to an equivalent load RL thorough a tuning capacitor. The reflected impedance at the input of the first transmit coil is denoted as $Z_{Tx1}$. The reflected impedance at the input of the second transmit coil is denoted as $Z_{Tx2}$.

In some embodiments, as shown in FIG. 10, each of the transmit coils is driven by an AC current ($I_1$ and $I_2$, respectively). The AC current is generated by the corresponding inverter in the transmit circuit. The phase of the currents $I_1$, $I_2$ are adjusted based on the coupling relationships such that the induced AC voltage at the receiver coil terminals are added in phase. The relationship between the resulted AC voltage $V_{Rx}$ and the coupling between TX and RX coils as well as the TX currents can be expressed by the following equation:

$$V_{Rx} = \omega(I_1 M_1 + I_2 M_2) \tag{1}$$

In Equation (1), $\omega$ is the operation angular frequency of the wireless power transfer system. Correspondingly, the received power at the load is:

$$P_{Rx} = \frac{V_{Rx}^2}{R_L} = \frac{\omega^2(I_1 M_1 + I_2 M_2)^2}{R_L} \tag{2}$$

The effective load of the receiver is $R_L$, and for simplicity, it is assumed that the transmitter and receiver coils are tuned to resonance at the operating frequency during power transfer where the reflected impedances are real values. (In practice, the real part of the reflected impedance is used in calculations to determine the Tx current distribution, and the auto-tuning circuit is expected to automatically control the reflected impedance at the output of the inverter to be within a predetermined reactance range for high efficiency inverter operation). The power contribution from each transmitter follows the ratio of the voltage contribution of each TX coil at the RX side. The power contribution of TX1 and TX2 can be expressed by the following equation:

$$P_{Tx1} = I_1^2 \cdot Z_{Tx1}; P_{Tx2} = I_2^2 \cdot Z_{Tx2}; P_{Tx1}/P_{Tx2} = I_1 M_1 / I_2 M_2 \tag{3}$$

In Equation (3), $Z_{Tx1}$ and $Z_{Tx2}$ are the reflected impedances presented to the inverter circuits of the first transmit circuit and the second transmit circuit, respectively. $P_{Tx1}$ and $P_{Tx2}$ are the transmit power of the first transmit circuit and the second transmit circuit, respectively. It should be noted that it is assumed that the equivalent series resistance (ESR) of the TX coils and the RX coil is very small compared to the reflected impedances ($Z_{Tx1}$, $Z_{Tx2}$) and the load impedance ($Z_L$).

From the loss perspective, for the same received voltage and power at the load the difference in the system loss (and power transfer efficiency) is determined by the ohmic losses in both TX coils. The total power loss ($P_{Loss}$) in the transmit coils can be expressed as:

$$P_{Loss} = (I_1^2 + I_2^2) \cdot R_{Coil} \tag{4}$$

In Equation (4), $R_{Coil}$ is the AC resistance (ACR) of the TX coils at the operating frequency. For simplicity, it is assumed that the ACR of TX1 is the same as that of TX2.

The current relationship between the transmit coils can be determined by a variety of control methods. Correspondingly for the same received voltage $V_{Rx}$ and power $P_{Rx}$, the total TX power loss $P_{Loss}$ varies from case to case. In the following sections, the derivation of the total $P_{Loss}$ for three different current control methods are discussed and compared in detail, and the current combination that offers the optimum efficiency (minimum loss) is determined, followed by introduction of the corresponding control method.

In a first control method, equal current distribution is used to control the wireless power transfer system.

Equal current distribution is the most straight forward control method where the currents of the transmit coils are kept the same (having a current ratio of 1), and the system adjusts both currents simultaneously, while keeping the ratio to account for load variations so as to achieve a stable $V_{Rx}$. In this case, the TX coil currents can be expressed as:

$$I_1 = I_2 = I_a = \frac{V_{Rx}}{\omega(M_1 + M_2)} \tag{5}$$

The total $P_{Lossa}$ can be expressed as:

$$P_{Lossa} = 2 \cdot I_a^2 \cdot R_{Coil} = \frac{V_{Rx}^2 \cdot R_{Coil}}{\omega^2} \cdot 2\left(\frac{1}{M_1 + M_2}\right)^2 \tag{6}$$

Correspondingly, the reflected impedances at the output of the inverters of the first and second transmit circuits can be written as:

$$Z_{Tx1} = \frac{\omega^2 M_1(M_1 + M_2)}{R_L}; Z_{Tx2} = \frac{\omega^2 M_2(M_1 + M_2)}{R_L} \tag{7}$$

In Equation (7), when the TX coil currents are the same, the ratio of the reflected impedance is the same as the ratio of the coupling strength (mutual inductance between TX coils and RX coil), which echoes the previous point that when TX currents are the same, the reflected impedance can be used directly to determine the coupling strength between coils. That is:

$$Z_{Tx1}/Z_{Tx2} = M_1/M_2 \tag{8}$$

In a second control method, the TX coil with better coupling transmits alone in the wireless power transfer system.

The method of selecting the coil with a higher coupling to transmit alone leverages the detected coupling between transmit coils and the receive coil. The method uses the TX coil with a higher coupling with the RX coil to transmit power by itself. The coupling information can be obtained using methods described earlier. In particular, this information can be obtained either before power transfer starts (by collecting the coupling strength feedback from the receiver) or after power transfer starts (by detecting the reflected impedances at the outputs of the inverters). When coupling between the receiver coil and the transmitter coils changes, the system continuously determines the TX coil with a higher coupling and sends AC current only to the TX coil that couples stronger with the receiver coil. The current is further adjusted according to the receiver's output voltage $V_{Rx}$. In this case, assuming the first TX coil has a higher coupling with the Rx coil, that is $M_1 > M_2$ then, the currents can be expressed by the following equation:

$$I_1 = I_b = \frac{V_{Rx}}{\omega M_1}; I_2 = 0 \tag{9}$$

The total $P_{Lossb}$ is:

$$P_{Lossb} = I_b^2 \cdot R_{Coil} = \frac{V_{Rx}^2 \cdot R_{Coil}}{\omega^2} \cdot \left(\frac{1}{M_1}\right)^2 \tag{10}$$

Correspondingly, the reflected impedances at the output of the inverter of the first transmit circuits is the same as those of the single transmit coil case. The reflected impedances at the output of the inverter of the first transmit circuits can be expressed by the following equation:

$$Z_{Tx1} = \frac{\omega^2 M_1^2}{R_L} \quad (11)$$

In a third control method, an optimum coil current distribution control mechanism is used to control the wireless power transfer system.

When multiple transmit coils simultaneously transmit power to one receiver, the optimum TX coil current distribution can be determined by fully taking advantage of the coupling strength between transmit coils and receive coil. The method controls the current distribution in the transmit coils according to the ratio of coupling strengths. That is, according to the earlier example, the higher the coupling between a TX coil and the RX coil, the more current is supplied to the TX coil. The current distribution can be expressed as:

$$I_1 = M_1 I_c; I_2 = M_2 I_c; I_1/I_2 = M_1/M_2 \quad (12)$$

The voltage $V_{Rx}$ at the output of the receiver output is:

$$V_{Rx} = \omega(I_1 M_1 + I_2 M_2) = \omega I_c (M_1^2 + M_2^2) \quad (13)$$

$$I_c = \frac{V_{Rx}}{\omega(M_1^2 + M_2^2)} \quad (14)$$

The total TX coil power loss ($P_{Lossc}$) can be written as:

$$P_{Lossc} = (M_1^2 I_c^2 + M_2^2 I_c^2) \cdot R_{Coil} = \frac{V_{Rx}^2 \cdot R_{Coil}}{\omega^2} \cdot \frac{1}{M_1^2 + M_2^2} \quad (15)$$

It can be derived that the reflected impedances $Z_{Tx1}$ and $Z_{Tx2}$ at the output of the inverters of the first and second transmit circuits are the same. $Z_{Tx1}$ and $Z_{Tx2}$ can be written as:

$$X_{Tx1} = Z_{Tx2} = \frac{\omega^2 (M_1^2 + M_2^2)}{R_L} \quad (16)$$

In summary, for the same coupling between TX and RX coils, the same receiver output voltage $V_{Rx}$, the same TX coil ACR, and the same operating frequency, the ratio between the total losses of the TX coils under the three different TX coil current distribution methods can be derived as:

$$P_{Lossa} : P_{Lossb} : P_{Lossc} = \frac{2}{(M_1 + M_2)^2} : \frac{1}{M_1^2} : \frac{1}{M_1^2 + M_2^2} \quad (17)$$

In Equation (17), When M1>M2, the following relationships are constantly true:

$$\frac{2}{(M_1 + M_2)^2} \geq \frac{1}{M_1^2 + M_2^2} \quad (18)$$

$$\frac{1}{M_1^2} \geq \frac{1}{M_1^2 + M_2^2} \quad (19)$$

As shown in Equations above, the third current distribution method described above (having the TX coil current proportional to the coupling strength between the corresponding TX coil and the RX coil) offers the minimum total TX coil losses under all coupling conditions. This indicates it is the optimum current distribution for achieving highest power transfer efficiency.

To implement the optimum coil current distribution, the system first detects the coupling relationships between the transmit coils and the receive coil. This can be done before the charging starts by exciting each transmitter coil. In particular, the excitation current may be applied individually (e.g., one single TX coil), and then applied together (e.g., two TX coils). Based on the results of these two excitation tests, the coupling strength and coupling relationship can be calculated based on the rectifier voltages reported by the receiver. The details of this method have been discussed extensively in the previous sections. Based on the coupling strengths (e.g., $M_1$, and $M_2$) and the coupling relationships, the transmit coil currents ($I_1$, and $I_2$) can be calculated such that the ratio of the transmit coil currents is close to the ratio of the coupling strength of the corresponding TX coils and the RX coil (e.g., $I_1/I_2 = M_1/M_2$), and the transmit coil currents have the proper phase relationship such that the induced current on the receiver coil would combine in phase.

Upon applying the calculated current parameters to the transmit circuits, the wireless power transfer from the TX to the RX starts. The output voltage regulation loop (e.g., the fast control loop) constantly monitors the receiver side output voltage $V_{Rx}$ while the load condition changes. In response to the variation of the load, the system changes the amplitude of the transmit currents at the same time while keeping the predetermined amplitude ratio between two TX coils. This voltage regulation loop is considered a fast control loop in comparison with the slow control loop for adjusting the ratio of the currents flowing into the two TX coils. This control loop is also used to respond to changes in the coupling conditions. For example, when the relative location/orientation of the receiver coil to the transmitter coil changes, the control loop adjusts the operating parameters accordingly. For example, assume the two transmit currents and the receiver output voltage are given by the following equations:

$$I_1 = M_1 I_0; I_2 = M_2 I_0 \quad (20)$$

$$V_{Rx} = \omega(I_1 M_1 + I_2 M_2) = \omega I_0 (M_1^2 + M_2^2) \quad (21)$$

The reflected impedance at the output of inverters in the two transmit circuits are the same, that is:

$$Z_{Tx1} = Z_{Tx2} = \frac{\omega^2 (M_1^2 + M_2^2)}{R_L} \quad (22)$$

The total TX coil loss under this condition is:

$$P_{Loss} = (M_1^2 I_0^2 + M_2^2 I_0^2) \cdot R_{Coil} = \frac{V_{Rx}^2 \cdot R_{Coil}}{\omega^2} \cdot \frac{1}{M_1^2 + M_2^2} \quad (23)$$

The change in the coupling occurs. For example, $M_1$ increase to $M_{1+}$. The TX currents for the two coils stay the same while the output voltage on the receiver side increases to $V_{Rx+}$. The output voltage $V_{Rx+}$ can be expressed as:

$$V_{Rx+} = \omega(I_1 M_{1+} + I_2 M_2) = \omega I_0(M_1 \cdot M_{1+} + M_2^2) > V_{Rx} \quad (24)$$

The regulation loop detects the increase of the receiver output voltage. In response to this change, the regulation loop then reduces the current supplied to both transmit coils while maintaining the predefined ratio between the two TX coils, thus the current to both TX coils are reduced proportionally to $I_{1-}$ and $I_{2-}$ to reduce the receiver output voltage back to the set target value of $V_{Rx}$. The output voltage can be expressed as:

$$V_{Rx} = \omega(I_{1-} M_{1+} + I_{2-} M_2) = \omega I_{0-}(M_1 \cdot M_{1+} + M_2^2) \quad (25)$$

The reduced current can be derived as:

$$\frac{I_{1-}}{I_1} = \frac{I_{2-}}{I_2} = \frac{I_{0-}}{I_0} = \frac{M_1^2 + M_2^2}{M_1 \cdot M_{1+} + M_2^2} < 1 \quad (26)$$

Under this operation point, the total loss on TX coils ($P_{loss+}$) can be expressed as:

$$P_{Loss+} = (M_1^2 I_{0-}^2 + M_2^2 I_{0-}^2) \cdot R_{Coil} = \frac{V_{Rx}^2 \cdot R_{Coil}}{\omega^2} \cdot \frac{1}{M_1 \cdot M_{1+} + M_2^2} > \frac{V_{Rx}^2 \cdot R_{Coil}}{\omega^2} \cdot \frac{1}{M_{1+}^2 + M_2^2} = P_{Lmin} \quad (27)$$

The power loss in Equation (27) is greater than the minimum possible total loss ($P_{Lmin}$) on TX coils in this coupling condition. The operating point is not optimized for efficiency.

At the same time, the reflected impedances for both transmit circuits can be derived as:

$$Z_{Tx1-} = \frac{\omega^2(M_1 M_{1+} + M_2^2)}{R_L} \cdot \frac{M_{1+}}{M_1} > Z_{Tx2-} = \frac{\omega^2(M_1 M_{1+} + M_2^2)}{R_L} \quad (28)$$

As shown in Equation (28), the transmitter with a higher coupling has a higher reflected impedance, which also indicates that the system is not operating at its most efficient TX current combination.

A current optimization control loop can be used to gradually adjust the current distribution among the TX coils such that the system can slowly converge to its optimum efficiency point. The system is able to track the changes in both the coupling and load variations. In the current optimization control loop, the system continuously monitors the reflected impedance at the output of the inverter of each transmit circuit, and adjusts the amplitude ratio of currents applied to the transmit coils until each transmit circuit measures approximately the same reflected impedances at the inverter outputs of the transmit circuits.

To continue the previous example, once a difference in reflected impedances $Z_{Tx1-}$ and $Z_{Tx2-}$ is detected, the system controls the transmit circuits to increase the current applied to the TX coil with higher reflected impedances. For example, the system could increase $I_{1-}$ by the ratio of the two measured reflected impedances, $\alpha$, where:

$$\alpha = \frac{Z_{Tx1-}}{Z_{Tx2-}} = \frac{M_{1+}}{M_1} \quad (29)$$

By using the current optimization control loop, the new current ratio between two coils becomes:

$$\frac{I_{1+}}{I_{2-}} = \alpha \cdot \frac{I_{1-}}{I_{2-}} = \frac{M_{1+}}{M_1} \cdot \frac{I_1}{I_2} = \frac{M_{1+}}{M_1} \cdot \frac{M_1}{M_2} = \frac{M_{1+}}{M_2} \quad (30)$$

As shown in Equation (30), the new adjusted ratio of the TX coil currents is the same as the ratio of the coupling strength between transmit coils and the receive coil. As a result, the new relationship between reflected impedance under this current distribution returns to its optimum efficiency point where two reflected impedances are equal as shown in the following equation:

$$Z_{Tx1+} = \frac{\omega^2(M_{1+}^2 + M_2^2)}{R_L} = Z_{Tx2+} \quad (31)$$

By using the current optimization control loop, the total Tx coil loss under this condition reaches its optimum power loss ($P_{Lmin}$).

In practice, the system can continuously monitor the change in the reflected impedances and gradually apply the adjustment to the ratio between coil currents until the reflected impedances at the output of all transmit circuits are almost the same.

Although embodiments of the present disclosure and its advantages have been described in detail, it should be understood that various changes, substitutions and alterations can be made herein without departing from the spirit and scope of the disclosure as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed, that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A wireless charging transmitter system, comprising:
   at least two transmit coils configured to simultaneously transmit electrical energy to a receive coil;
   at least two transmit circuit units, each of the transmit circuit units being electrically connected to each of the transmit coils, and being configured to supply a current to a corresponding transmit coil;
   a detection circuit electrically connected to each of the transmit circuit units, and configured to detect a coupling relationship between each of the transmit coils and the receive coil;

a communication module configured to acquire the coupling relationship; and a controller electrically connected to the detection circuit, the communication module, and each of the transmit circuit units, and configured to individually control, based on the coupling relationship, a current output by each of the transmit circuit units to control current parameters of each of the transmit coils so that current magnitudes and phases of the at least two transmit coils are independent from each other.

2. The wireless charging transmitter system according to claim 1, wherein:

at least one of the transmit circuit units comprises an inverter circuit, the inverter circuit being electrically connected to a corresponding transmit coil, the controller, and an external direct-current power source, and being configured to convert a direct current output by the external direct-current power source to an alternating current and transmit the alternating current to the corresponding transmit coil.

3. The wireless charging transmitter system according to claim 2, wherein:

at least one of the transmit circuit units further comprises a DC/DC converter circuit electrically connected to the external direct-current power source, the inverter circuit, and the controller, the DC/DC converter circuit being configured to convert an output voltage of the external direct-current power source and send a converted output voltage to the inverter circuit.

4. The wireless charging transmitter system according to claim 3, wherein:

at least one of the transmit circuit units further comprises a tuning/compensation circuit electrically connected to the inverter circuit, the corresponding transmit coil, and the controller, the tuning/compensation circuit being configured to dynamically tune and compensate the corresponding transmit coil.

5. The wireless charging transmitter system according to claim 1, wherein:

phases between currents of the transmit coils are coherent, and orientations of magnetic fields generated by the transmit coils are not parallel.

6. The wireless charging transmitter system according to claim 5, wherein:

a coupling coefficient of the magnetic fields between the transmit coils is less than a predetermined threshold.

7. A method for controlling a wireless charging transmitter system comprising at least two transmit coils, at least two transmit circuit units, a receive coil and a controller, the method comprising:

acquiring a detection signal, and determining a coupling relationship between each of the transmit coils and the receive coil based on the detection signal;

determining a current parameter for each of the transmit coils based on the coupling relationship; and determining and generating a control signal based on the current parameter to separately control the at least two transmit circuit units to supply currents to the at least two transmit coils based on the current parameter, wherein current magnitudes and phases of the at least two transmit coils are independent from each other.

8. The method according to claim 7, wherein:
the coupling relationship comprises a coupling strength;
the current parameter comprises a current magnitude;
at least one of the at least two transmit circuit units comprises an inverter circuit, the inverter circuit being electrically connected to a corresponding transmit coil, the controller, and an external direct-current power source, and being configured to convert a direct current output by the external direct-current power source to an alternating current and transmit the alternating current to the corresponding transmit coil; and determining the coupling relationship between each of the transmit coils and the receive coil based on the detection signal comprises:

determining the coupling strength between each of the transmit coils and the receive coil based on the detection signal; and determining the current parameter for each of the transmit coils based on the coupling relationship comprises determining a current magnitude for each of the transmit coils based on the coupling strength.

9. The method according to claim 8, wherein:
the detection signal comprises an input impedance of an equivalent load of the inverter circuit.

10. The method according to claim 9, further comprising:
adjusting current parameters of the first transmit coil and the second transmit coil until the first input impedance associated with the first transmit coil and the second input impedance associated with the second transmit coil are substantially equal.

11. The method according to claim 10, wherein:
a greater coupling strength indicates a greater current magnitude for the corresponding transmit coil.

12. The method according to claim 7, wherein:
the detection signal comprises a received signal parameter of the receive coil.

13. The method according to claim 12, further comprising:
adjusting current parameters of the first transmit coil and the second transmit coil such that a current magnitude of the first transmit coil is proportional to a first coupling strength between the first transmit coil and the receive coil, and a current magnitude of the second transmit coil is proportional to a second coupling strength between the second transmit coil and the receive coil.

14. The method according to claim 13, wherein:
at least one of the at least two transmit circuit units further comprises a DC/DC converter circuit, the DC/DC converter circuit being electrically connected to the external direct-current power source, the inverter circuit, and the controller; and the control signal comprises a first control signal, wherein the first control signal is applied to the DC/DC converter circuit, and determining the control signal based on the current parameter comprises determining the first control signal based on the current magnitude to control an output voltage of the DC/DC converter circuit.

15. The method according to claim 14, wherein:
the coupling relationship comprises a coupling effect relationship;
the current parameter comprises a current phase relationship; and determining the coupling relationship between each of the transmit coils and the receive coil based on the detection signal further comprises:

determining the coupling effect relationship between each of the transmit coils and the receive coil based on the detection signal; and determining the current parameter of each for the transmit coils based on the coupling relationship comprises determining the current phase relationship between the transmit coils based on the coupling effect relationship.

16. The method according to claim 15, wherein:
the detection signal comprises a received signal parameter of the receive coil;
the received signal parameter comprises a first received signal parameter, a second received signal parameter, and a third received signal parameter; and
determining the coupling effect relationship between each of the transmit coils and the receive coil based on the detection signal comprises:
  controlling a first transmit coil of the at least two transmit coils to transmit electrical energy to the receive coil individually, and acquiring the first received signal parameter by a communication module;
  controlling a second transmit coil of the at least two transmit coils to transmit electrical energy to the receive coil individually, and acquiring the second received signal parameter by the communication module;
  controlling the first transmit coil and the second transmit coil of the at least two transmit coils to simultaneously transmit electrical energy in-phase to the receive coil, and acquiring the third received signal parameter by the communication module; and
  determining a first coupling effect relationship between the first transmit coil and the receive coil, and a second coupling effect relationship between the second transmit coil and the receive coil based on the first received signal parameter, the second received signal parameter, and the third received signal parameter.

17. The method according to claim 16, wherein:
each of the first coupling effect relationship and the second coupling effect relationship comprises a positive coupling relationship and a negative coupling relationship; and
determining the first coupling effect relationship between the first transmit coil and the receive coil, and the second coupling effect relationship between the second transmit coil and the receive coil based on the first received signal parameter, the second received signal parameter, and the third received signal parameter comprises:
  determining that the first transmit coil and the second transmit coil are in the positive coupling relationship with the receive coil if the third received signal parameter is greater than or equal to a maximum value of the first received signal parameter and the second received signal parameter; and
  determining that the first transmit coil and the second transmit coil are in the negative coupling relationship with the receive coil if the third received signal parameter is less than the maximum value of the first received signal parameter and the second received signal parameter.

18. The method according to claim 17, wherein determining the current phase relationship between the transmit coils based on the coupling effect relationship comprises:
  determining that the first transmit coil and the second transmit coil have the same current phase if the first transmit coil and the second transmit coil are in the positive coupling relationship with the receive coil; and
  determining that the first transmit coil and the second transmit coil have reverse current phases if the first transmit coil and the second transmit coil are in the negative coupling relationship with the receive coil.

19. The method according to claim 17, wherein:
the control signal comprises a second control signal, the second control signal being configured to drive the inverter circuit;
determining the control signal based on the current parameter comprises determining a phase of the second control signal based on the current phase relationship; and
the wireless charging transmitter system further comprises an oscillator, the oscillator being electrically connected to the controller, and being configured to supply a clock signal, and the method further comprises acquiring the clock signal and using the clock signal as a reference signal for generating the second control signal.

20. The method according to claim 7, wherein:
at least one of the at least two transmit circuit units further comprises a tuning/compensation circuit, the tuning/compensation circuit being electrically connected to an inverter circuit, a corresponding transmit coil, and the controller, and the method further comprises adjusting a parameter of the tuning/compensation circuit based on an input impedance of an equivalent load of the inverter circuit to dynamically tune and compensate the corresponding transmit coil.

* * * * *